United States Patent [19]
Mizutani et al.

[11] Patent Number: 5,898,511
[45] Date of Patent: Apr. 27, 1999

[54] PROCESS FOR MAKING HOLOGRAMS AND HOLOGRAPHY DEVICE

[75] Inventors: Yasuhiro Mizutani, Inabe-gun; Minoru Ohta, Okazaki; Toshiki Saburi, Inazawa; Tetsuya Kato, Okazaki; Hiroyuki Tatebayashi, Handa, all of Japan

[73] Assignee: Nippondenso Co., Ltd., Japan

[21] Appl. No.: 08/384,800

[22] Filed: Feb. 6, 1995

Related U.S. Application Data

[63] Continuation of application No. 08/115,151, Sep. 2, 1993, abandoned.

[30] Foreign Application Priority Data

| Sep. 3, 1992 | [JP] | Japan | 4-260795 |
| Oct. 12, 1992 | [JP] | Japan | 4-300529 |
| Oct. 23, 1992 | [JP] | Japan | 4-309459 |
| Aug. 5, 1993 | [JP] | Japan | 5-215161 |

[51] Int. Cl.⁶ .................. G03H 1/00; G02B 5/32
[52] U.S. Cl. ................... 359/13; 359/1; 359/15
[58] Field of Search ................... 359/3, 8, 6, 9, 359/24, 14, 15, 13

[56] References Cited

U.S. PATENT DOCUMENTS

| 3,560,210 | 2/1971 | Grobin | 430/1 |
| 4,209,250 | 6/1980 | James et al. | |
| 4,582,389 | 4/1986 | Wood et al. | 359/14 |
| 4,600,271 | 7/1986 | Boyer | |
| 4,613,200 | 9/1986 | Hartman | |
| 4,786,125 | 11/1988 | Magarinus et al. | 359/8 |
| 4,815,800 | 3/1989 | Chern et al. | 359/3 |
| 4,832,427 | 5/1989 | Nanba | |
| 4,863,225 | 9/1989 | Howard | 359/8 |
| 4,874,214 | 10/1989 | Cheysson et al. | 359/15 |
| 4,953,923 | 9/1990 | Wreede | 359/3 |
| 4,981,332 | 1/1991 | Smith | |
| 5,105,287 | 4/1992 | Moss et al. | 359/3 |
| 5,144,459 | 9/1992 | Felske | |
| 5,198,914 | 3/1993 | Arns | 359/8 |
| 5,243,449 | 9/1993 | Smith | 359/13 |
| 5,282,066 | 1/1994 | Yu et al. | 359/3 |
| 5,307,438 | 4/1994 | Bilkadi et al. | 385/141 |
| 5,330,264 | 7/1994 | Ando et al. | 359/8 |

FOREIGN PATENT DOCUMENTS

| 0 119 128 | 9/1984 | European Pat. Off. |
| 0 216 692 | 4/1987 | European Pat. Off. |
| 0 278 395 | 8/1988 | European Pat. Off. |
| 0 405 540 | 1/1991 | European Pat. Off. |
| 61-29508 | 7/1986 | Japan |
| 64 40883 | 2/1989 | Japan |
| 1231082 | 9/1989 | Japan |
| 2171538 | 8/1986 | United Kingdom |
| 2234605 | 2/1991 | United Kingdom |

OTHER PUBLICATIONS

Patent Abstract of Japan, vol. 15 No. 449 (P–1275) Aug. 1991 re JP–A–3188479.

"Exposure of Holograms on Low Optical Quality Substrates", Research Disclosure, Sep. 1990 No. 317.

Patent Abstract of Japan, vol. 15, No. 449, Nov. 14, 1991.

Optics Letter, "Photopolymer–based Stratified volume Holographic Optical Elements," vol. 17, No. 23, pp. 1709–1711.

IBM Technical Disclosure Bulletin, "Multiproduction of Holograms," vol. 10, No. 12, May 1968, p. 1895.

Patent Abstract of Japan, vol. 13, No. 554, Dec. 11, 1989.

*Primary Examiner*—Cassandra Spyrou
*Assistant Examiner*—Audrey Chang
*Attorney, Agent, or Firm*—Pillsbury Madison & Sutro, LLP

[57] ABSTRACT

A plurality of hologram elements are simultaneously exposed to a constructing light while they are arranged in the form of a stack, so that the incident beam can be uniform within the exposure area. The plurality of hologram elements should be transparent to the constructing light.

16 Claims, 16 Drawing Sheets

PROCESS FOR MAKING HOLOGRAMS AND HOLOGRAPHY DEVICE

This is a continuation of application Ser. No. 08/115,151, filed on Sep. 2, 1993 now abandoned.

BACKGROUND OF THE INVENTION

1. Field of the Invention

The present invention relates to a process for making holograms. The present invention also concerns holography devices.

2. Description of Related Art

Holograms are made by illuminating a reference beam and an object beam onto a photosensitive material to produce interference fringes therein.

Multiple holograms are made by exposing a photosensitive film with a large area $S_o$ to constructing beams to form a hologram with a large area and then splitting the film into hologram elements each with a small area S. Namely, referring to FIG. 1, a reference beam 1 is illuminated from the right onto the photosensitive film 100 with a large area $S_o$ and an object beam 2 is illuminated onto the photosensitive film from left to produce interference fringes 111 to 116 (112 to 115 not shown) in the film and thereby obtain a large hologram 100, which is then divided into a number of holograms 101 to 106 with a small area S.

This process of splitting a large hologram into a number of small holograms involves the following problems.

First, the constructing beams are non-uniform in the plane of the photosensitive film, so that the diffraction efficiency of the hologram is not uniform in the plane of the large hologram.

Second, the power of a laser per unit area of the photosensitive film is reduced due to the large area of the film, but the energy necessary for exposing the unit area of the film is constant, not decreased, and, therefore, the time period for exposing the film must be elongated, thereby the path length of the constructing laser beam may be varied, making interference fringes fuzzy.

Third, if the object beam is a diverging light, the split holograms have interference fringes having different directions from each other, so that when the holograms are used in a holography device with a preliminarily fixed constant reconstructing light, the reconstructed images are different in position depending on the holograms. An example of such a holography device is a head-up display used for an automobile, described below.

Fourth, prisms and lenses used for the exposure of the photosensitive film become larger, thus increasing the cost.

An object of the present invention is to provide a process for making a number of uniform holograms in one exposure step.

The use of a heads-up display for displaying speed, etc., in front of a windshield of an automobile has attracted attention. A holography device utilizing the wavelength-selective diffraction and reflection characteristics of a hologram element has been proposed for the head-up display.

Referring to FIG. 2, in the heads-up display 10, a beam 20 involving an image for display is emitted from a display unit 30, and diffracted and reflected by a holography device 40. The diffracted and reflected beam 21 is then reflected by a deposited layer 311 on a windshield 31. A driver 32 senses the reflected beam 211 from the deposited layer 311 and can view a virtual image 212 in front of the windshield 31.

Referring to FIG. 3, in the heads-up display device, the display unit 30 includes an incandescent lamp 301, a liquid crystal panel 302 disposed in front of the incandescent lamp 301, a reflecting mirror 303 and a holography device 40. The liquid crystal panel 302 can display images 212 of speed, master warnings, turning indications, maps and so fourth. The display unit 30 is generally disposed near an instrument panel 33.

Referring to FIG. 4, in the holography device 40, a beam 20 involving an image for display is incident through a cover plate 42 on the hologram element 41, by which the beam 20 is diffracted and reflected. The reflected beam is emitted from the cover plate 42 as the reconstructing beam 21. Interference fringes with predetermined diffraction and reflection characteristics have been previously formed in the hologram element 41. In FIG. 4, 22 denotes a beam reflected at the surface of the cover plate 42, 431 and 470 denote a sealant, and 44 denotes a bottom cover plate. In a holography device 40 of a heads-up display, for example, a hologram element 41 having the wavelength selectivity as shown in FIG. 5 and a reflecting characteristic as of a concave mirror is often used.

Referring back to FIG. 4, the surface reflecting beam 22 causes a noise image disturbing the normal image 212 to be displayed (FIG. 2). Other causes for a noise image include scattering of light transmitting through the hologram element 41, noise images recorded in the hologram element 41, and so fourth. Nevertheless, the main noise source is the surface reflecting beam 22.

It has been proposed to provide an anti-reflection film on the surface of the cover plate 42 to reduce the surface reflecting beam 22 reflecting at the surface of the cover plate 42. This anti-reflecting film may be very effective. For example, an anti-reflecting film of a single layer of $MgF_2$, $TiO_2$, $ZrO_2$ or the like or of a multilayer of a combination thereof can reduce the noise rate from about 4%, which is typical in a conventional device, to about 0.3%. Nevertheless, there still remains a noise rate of about 0.3% and, moreover, the anti-reflecting film is expensive and is not resistant to abrasion.

The second object of the present invention is to provide a holography device with a reduced noise image, without using an expensive and non-durable anti-reflecting film.

Referring to FIG. 4, 431 denotes a sealant to optically seal the upper cover plate 42 and a substrate 411 of the hologram element 41, and 470 denotes a sealant to optically seal the lower cover plate 44 and the hologram element 41. The components of the holography device 40, i.e., the upper and lower cover plates 42 and 44, the substrate 411, the hologram element 41 and the sealants 431 and 470, are made of materials having almost the same refractive indexes, to prevent noise beams by reflections. The cover plates 42 and 44 and the substrate 411 are glass, the sealants 431 and 470 are an adhesive of epoxy resins, acrylic resins, UV-curable resins, or the like.

The reason for the frequent use of the above adhesive is that the sealant resins are cured by heating or UV irradiation so that the hologram element and the glass are adhered with each other, which is advantageous. Nevertheless, the resin sealants used in conventional hologram devices have the following drawbacks.

First, the viscosity is high, e.g., about 500 cP for an epoxy resin, so that air may be easily entrained and the refractive index of the sealant is thus varied to cause noise light.

Second, the refractive index is essentially fixed for each material. For example, the refractive index of an epoxy resin is almost constant, about 1.55, which makes the complete adjustment with the substrate and cover plates difficult and causes noise light by reflection.

Third, heat treatment or UV irradiation treatment is necessary and the reaction may be exothermic. For example, an epoxy resin should be heated to about 100° C. and the temperature increases to about 150° C. by the reaction heat. As a result, the sealant may react with a photosensitive material of the hologram element to form a layer of a reaction product having a refractive index different from those of the sealant and the hologram element. For example, when the photosensitive material comprises a photopolymer such as polyvinyl pyrolidone, poly(N-vinyl carbazol) as a matrix polymer, a reaction product layer having a different refractive index is formed to cause white clouding, noise light, etc. A barrier layer should be provided on the surface of photosensitive layer in order to prevent the formation of the above reaction product layer.

Fourth, the resin sealant, upon being cured, may be partially peeled off from the cover plate or from the hologram element, which makes the refractive index irregular, and noise light appears.

The third object of the present invention is to provide a holography device in which the refractive indexes of the optical components can be easily matched with each other and deterioration of the photosensitive material is avoided.

SUMMARY OF THE INVENTION

In a first aspect the present invention, the above first object of the invention is attained by providing a process for making a plurality of holograms, comprising the steps of arranging a plurality of transparent photosensitive layers in a stack, illuminating the plurality of the transparent photosensitive layers with a reference beam and an object beam from the top to the bottom layers thereof to produce interference fringes in each of the plurality of the transparent photosensitive layers, and developing the plurality of the transparent photosensitive layers to make the plurality of holograms.

In a second aspect of the present invention, the above described second object of the present invention is attained by providing a holography device comprising a hologram element and a cover plate disposed on the hologram element, a beam concerning an image to be displayed being incident on the cover plate and diffracted and reflected by the hologram element to emit a reconstructing beam by which an image is created, the cover plate having a top surface which has a shape identical to a surface shape of a mirror having a reflection characteristic identical to the diffraction and reflection characteristic of the hologram element.

In a third aspect of the present invention, the above described third object of the present invention is attained by providing a hologram device comprising a transparent hologram plate of a hologram element formed on a hologram substrate, cover plates sandwiching the hologram plate, and sealants for sealing the interfaces of the hologram plate and the cover plates, the sealants being a liquid composition comprising two or more materials having refractive indexes and viscosities one or both of which are different from each other.

DESCRIPTION OF THE PREFERRED EMBODIMENTS

Figure 1:
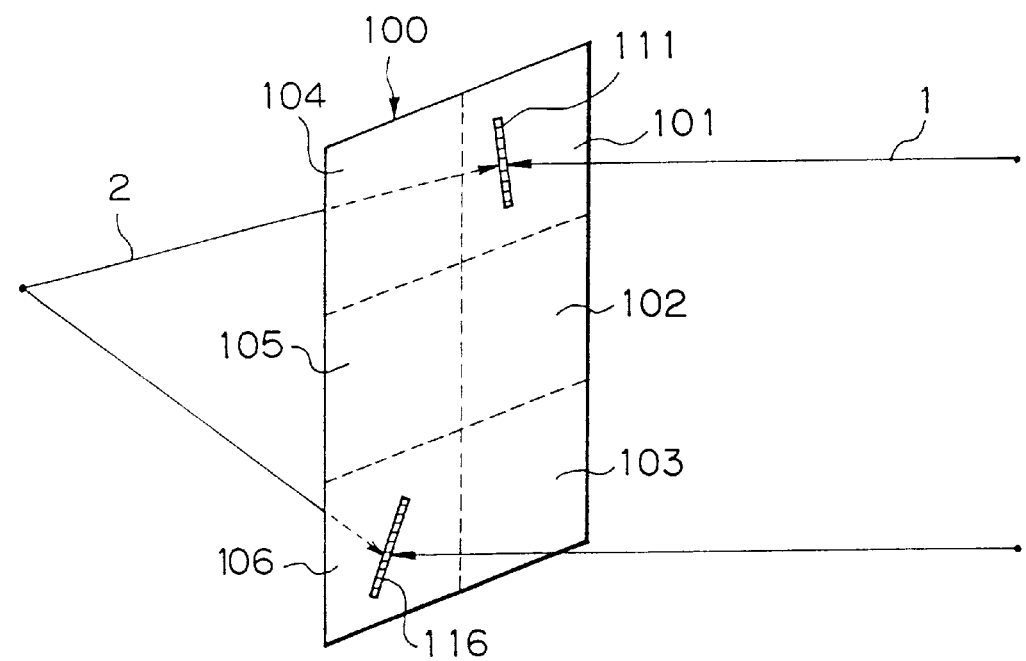
FIG. 1 shows a conventional process for making a plurality of hologram elements arranged in a plane.

In the first aspect of the present invention, the important feature is that the photosensitive layers are transparent, a plurality of the transparent photosensitive layers are arranged in a stack in the direction of the path of a constructing beam, e.g., a combination of a reference beam and an object beam, and the plurality of the transparent photosensitive layers in the form of a stack are simultaneously exposed to the constructing beam to obtain the plurality of holograms.

Conventionally, a single photosensitive layer having a large area (or a plurality of photosensitive layers) is arranged in a plane perpendicular to the path of the constructing beam. In contrast, in the present invention, a plurality of photosensitive layers are arranged in a stack in the direction of the path of constructing beams, and the photosensitive layers are made of a transparent photosensitive material. The photosensitive layer may be a film of a photosensitive material or a layer of a photosensitive material supported by a transparent substrate. The substrate may be a glass plate, a resin film or the like. Alternatively, the substrate may be eliminated, if possible.

In this process of the present invention, a plurality (n) of photosensitive layers are arranged in a stack in the direction of the path of a constructing beam. Accordingly, the area S to which the constructing beam is illuminated is 1/n of the area $S_o$ to which the constructing beam is illuminated when the large photosensitive layer or the plurality (n) of photosensitive layers are conventionally arranged in a plane. As a result, the power of the exposure in the area S of the unit photosensitive layer of the present invention is more uniform than in the area $S_o$ of the large photosensitive layer in the conventional process and the obtainable holograms have more uniform diffraction efficiency in the plane of the holograms.

In the present invention, the directions of the interference fringes of the photosensitive layers are identical in all of the plurality of the photosensitive layers, while they are dispersed among the layers in a conventional process. Of course, even in this aspect of the present invention, there are slight differences of the interference fringes among the holograms in the direction of the beam path depending on gaps between the photosensitive layers. Nevertheless, the thickness of the photosensitive layers is extremely thin and therefore the gaps between the photosensitive layers can be made very small. The differences of the interference fringes among the holograms can be extremely small in comparison with the difference of the interference fringes among the conventional holograms. In practice, the effect of the differences of the interference fringes among the holograms in the direction of the beam path to the image produced by a head-up display can therefore be negligible, as shown later in Example 1.

The exposure time can be controlled within an adequate time period by selecting the number of the photosensitive layers arranged in a stack depending on the transparency of the layers. As a result, the fuzziness of the interference fringes due to excessive exposure time can be prevented.

Thus, a plurality of uniform hologram elements can be produced by a single exposure step in accordance with the first aspect of the present invention.

A holography device in the second aspect of the present invention comprises a hologram element and a cover plate disposed on the hologram element, a beam being incident on the cover plate and diffracted and reflected by the hologram element to emit a reconstructing beam by which an image is created, the cover plate having a top surface which has a shape identical to a surface shape of a mirror having a reflection characteristic identical to the diffraction and reflection characteristic of the hologram element.

In this holography device, a hologram element is disposed under a transparent cover plate. In the hologram element, a hologram having a predetermined diffraction and reflection characteristic has been previously made therein. The reflection characteristic of the hologram element is like a mirror with a curvature, not like a plane mirror, in the second aspect of the present invention. The diffraction and reflection characteristic of the hologram element can be expressed by the wavelength selectivity (see FIG. 5, for example) and the reflection efficiencies of the selected wavelengths. The diffraction and reflection characteristic of the hologram element is designed depending on various applications of the holography device. For example, when the reflection characteristic of the hologram element is selected to be that of a concave mirror, the hologram element can act as an enlarging mirror and therefore it is desirable for use as a heads-up display.

In this holography device, the reflection characteristic of the surface of the cover plate on which a beam is incident is the same as the diffraction and reflection characteristic of the hologram element. Accordingly, referring to FIG. 7, the reflecting angle $\theta_2'$ (in relation to the horizontal plane, the same in the following) of the surface reflecting beam 22 reflected at the surface 4212 of the cover plate 421 becomes the same as the emitting angle $\theta_2$ (in relation to the horizontal plane, the same in the following) of the reconstructing beam 21 which was reflected by the hologram element 41 and exits from the surface 4212 of the cover plate 421, namely, $\theta_2'=\theta_2$. Therefore, the surface reflection beam 22 and the reconstructing beam 21 are parallel beams.

Figure 4:
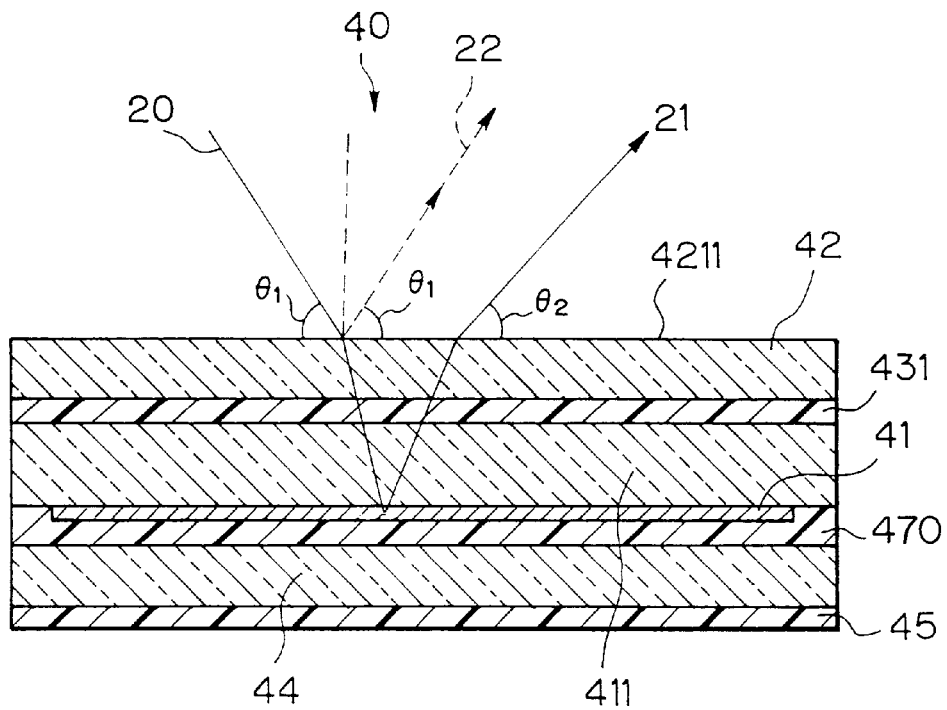
FIG. 4 is a sectional view of a conventional hologram device.

In contrast, if the cover plate 421 has a flat top surface 4211 as shown in FIG. 4, the reflecting angle $\theta_1'$ of the reflecting beam 22 is equal to the incident angle $\theta_1$ of the incident beam 20. Therefore, the emitting angle $\theta_2$ of the reconstructing beam 21 is not identical to the reflecting angle $\theta_1'$ of the reflecting beam 22, or the reconstructing beam 21 is not parallel to the reflecting beam 22 ($\theta_1' \neq \theta_2$). This is because the reflection characteristic of the hologram element 41 is not like a plane mirror, i.e., not the same as the reflection characteristic of the plane cover plate 42.

In the second aspect of the present invention, the surface shape of the cover plate 421 is made to be identical to the surface shape of a mirror (equivalent mirror surface) exhibiting the same reflection characteristic as that of the hologram element 41, so that the top surface 4212 of the cover plate 421 is optically parallel to the equivalent mirror surface, to thereby make the reflecting angle 2 the same as the emitting angle $\theta_2$.

As a result, the noise image produced by the surface reflecting beam 22 is coincident with or overlaps the normal image by the reconstructing beam 21, and therefore does not disturb a viewer from viewing the normal image. A slight difference L' exists between the reconstructing and surface reflecting beams 21 and 22, but the difference L' is very small so that it does not disturb the view of the normal image.

Thus, in accordance with the holography device of the second aspect of the present invention, the noise image or view-disturbance caused by the surface reflection can be substantially removed, an expensive anti-reflection film is not necessary and the anti-reflection property is durable.

In the third aspect of the present invention, a hologram device comprises a transparent hologram plate of a hologram element formed on a hologram substrate, cover plates sandwiching the hologram plate, and sealants for sealing the interfaces of the cover plate and the hologram plate, the sealants being a liquid composition comprising two or more materials having a refractive index and viscosity one or both of which are different from each other.

The important feature of this aspect resides in that the interfaces of the hologram plates and the cover plates are sealed with a liquid sealant comprised of two or more materials having a refractive index and viscosity one or both of which are different. The two or more materials may have the same or different chemical composition as long as they are different in one or both of the refractive index and viscosity. For example, silicone oil, butyl phthalate, xylene, etc. may be used as the component material for the liquid sealant. The liquid sealant may also be composed of a solute and a solvent.

In the liquid sealant of the present invention, it is easy to adjust the refractive index of the sealant by selecting the materials and the ratio of the mixed materials. It is easy to match the refractive index of the sealant with the refractive index of the cover plate, the hologram element and the hologram substrate.

It is possible to obtain a liquid sealant having a low viscosity by selecting a material having a low viscosity, so that air entrainment into the sealant can be prevented and, even if entrained, the entrained air can be easily removed.

Further, since a liquid is sealed as is, a curing treatment as used for a resin sealant is not necessary and deterioration of the photosensitive material by the curing treatment does not occur.

Thus, the third aspect of the present invention provides a holography device in which the matching of the refractive indexes of the components is easy and the deterioration of the photosensitive material is prevented.

EXAMPLES

Example 1

FIGS. 8 to 11 are referred to in the following discussion. The hologram elements made in this Example are to be used for a heads-up display in an automobile.

Figure 8:
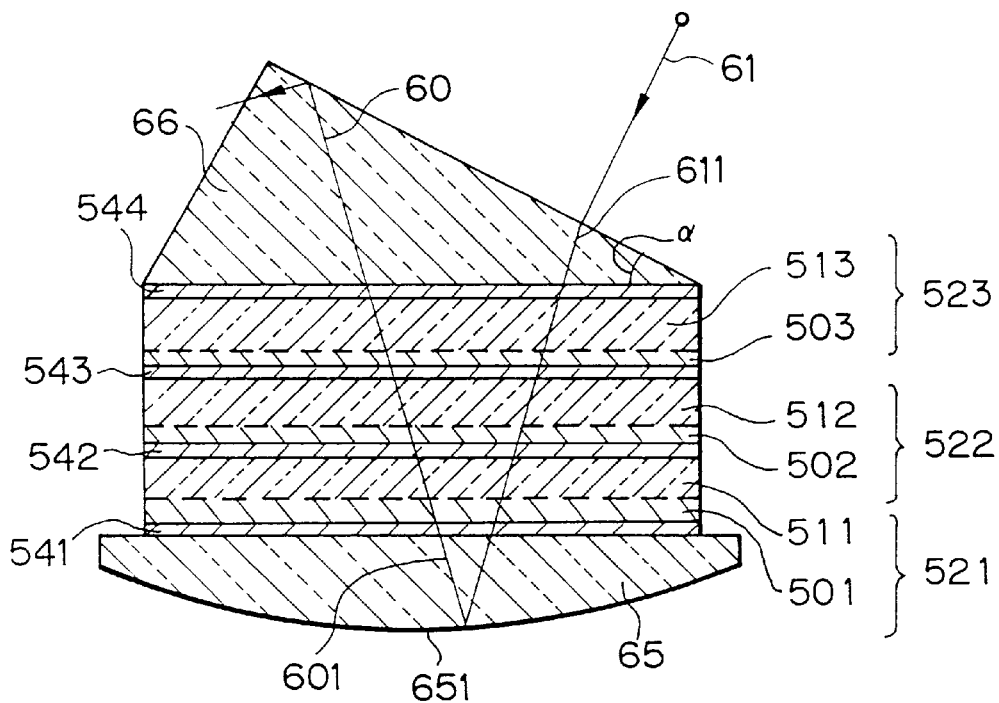
FIG. 8 is a standard view showing a process for making a plurality of hologram elements according to the first aspect of the present invention.

Referring to FIG. 8, this Example relates to a process for making holograms by interference of an object beam 61 and a reference beam 60 in photosensitive layers 501 to 503. The photosensitive layers 501 to 503 are transparent and are arranged in the direction of the propagation of the object beam 61 and the reference beam 60, thereby simultaneously exposing the plurality of the photosensitive layers 501 to 503 to the constructing beams.

The photosensitive layers 501 to 503 are formed on the bottoms of transparent substrates 511 to 513, respectively, to form photosensitive plates 521 to 523. The photosensitive plates 521 to 523 are made by forming a 25 µm-thick layer 41 of dichromate gelatin (D.C.G.) as a photosensitive material on the bottom of a substrate 411 of soda glass (refractive index of 1.52) with 112 mm×46 mm×1.8 mm, geling or drying, and stabilizing in an atmosphere at about 20° C. and about 50% RH.

The photosensitive plates 521 to 523 are sandwiched by a spherical lens 65 having a predetermined focal length of 1000 mm and a prism 66. Both surfaces of each of the photosensitive plates 521 to 523 are sealed by refractive index-adjusting liquids 541 to 544, for example, silicon oil. The refractive index adjusting liquids having a refractive index matched with those of the lens, prism, substrate and photosensitive material are preferably able to adjust the refractive index from 1.48 to 1.56 when the lens and substrate are of BK7, a kind of optical glass, and the photosensitive material is dichromate gelatin. The refractive index adjusting liquids may be xylene, benzil acrylate, etc., instead of silicone oil. If the lens 65, prism 66, substrates 511 to 513, photosensitive layers 501 to 503, and liquids 541 to 544 do not have almost the same refractive index, a light beam is reflected at the interface of the components where the refractive indexes of the components are different, to thereby cause a noise hologram.

An argon laser beam 61 with a wavelength of 514.5 nm as a reference beam is incident on the assembly from the side of the prism 66. The reference beam 611 propagates straight forward in the respective mediums or optical components having the almost same refractive index toward the lens 65, reaches the reflecting film 651 formed on the bottom surface of the lens 65, and is reflected by the reflecting film 651. The reflected beam 601, which acts as an object beam 60, and the incident beam 611, which acts as the reference beam 61, create interference fringes in the photosensitive layers 501 to 503.

As a result, hologram elements in which a concave mirror as an enlarging mirror has been recorded in the photosensitive layers 501 to 503 are made.

Figure 5:
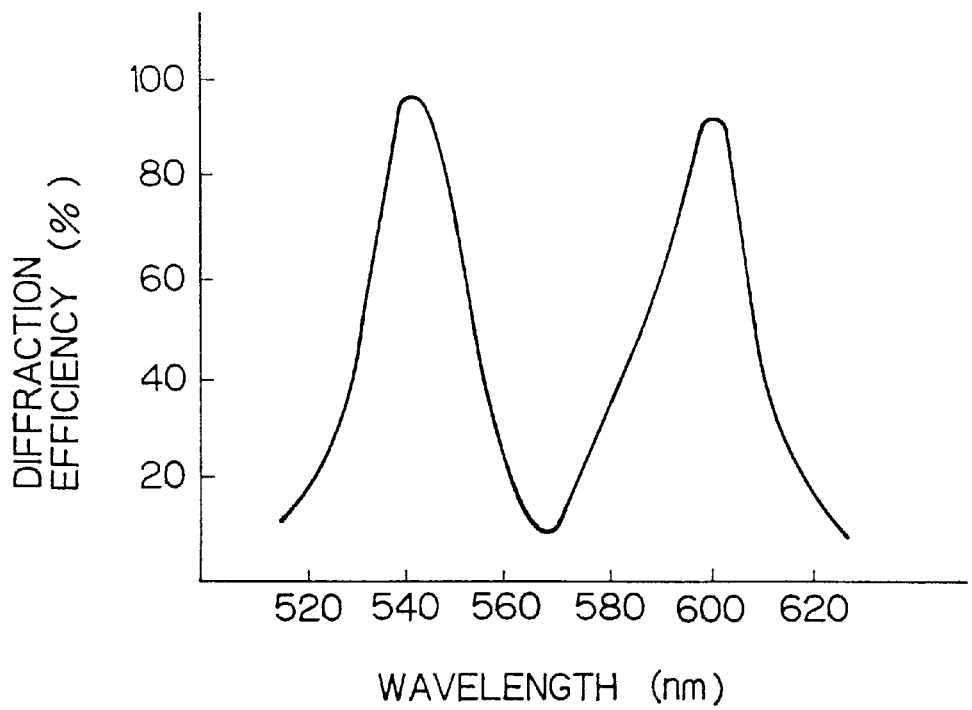
FIG. 5 shows the spectral distribution of the diffraction of a conventional hologram element.
Figure 9:
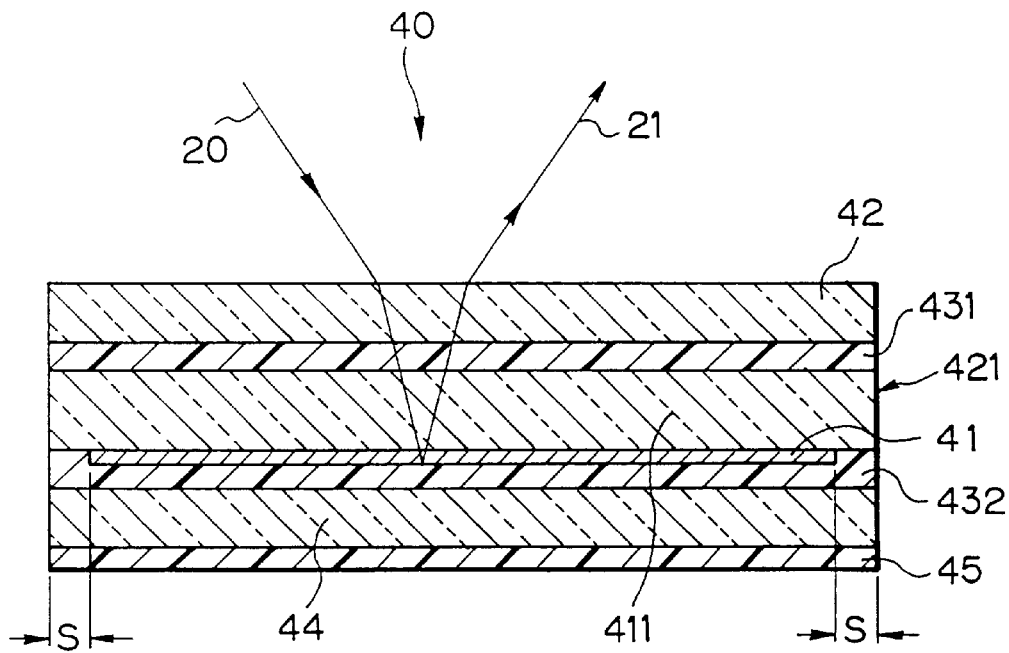
FIG. 9 is a sectional view showing a hologram element made using the process of the first aspect of the present invention.

Here, the exposure is repeated while the incident angle of the incident beam 61 is changed, so as to form a hologram element having a wavelength characteristic of the reconstructing beam of two colors of 540 nm and 600 nm, at an incident angle at 33.5°, as shown in FIG. 9. Namely, referring to FIG. 8, when the hologram element 41 (501 to 503) made by the above process is set in a holography device 40 and an incident beam 20 is incident to the holography device 40, the reconstructing beam 21 has the wavelength characteristic as shown in FIG. 5. FIG. 5 shows the diffraction wavelength characteristic of a hologram which exhibits high efficiencies of diffraction at 540 nm and 600 nm (two colors).

The total energy of the incident beam 61 used for the exposure or constructing is 500 mJ.

After the exposure, the hologram plates 521 to 523 are cleaned with water until the color disappears, and are immersed in a commercially available fixing solution for photography (Rapid Fixer by Kodak) for 10 minutes. The hologram plates 521 to 523 are again cleaned with water, immersed in a 90%-isopropanol solution for 10 minutes, and dried with hot air. Thereafter, the plates are aged at 150° C. for 4 hours so that the hologram elements do not suffer from variations in characteristic wavelength in an actual automobile.

Referring to FIG. 9, the hologram plate 421(411 and 41) is then sandwiched by cover plates 42 and 44 and optically sealed with sealants 431 and 432, to obtain a hologram device 40. The sealants 431 and 432 are a commercially available epoxy-based thermosetting resin (CS-2340-5 by Cemedyne) having a refractive index of 1.55 and have a thickness of 50 m. The periphery of the hologram element 41 is removed by a width of S (5 mm), as shown in FIG. 9, before sealing. The cover plates 42 and 44 are glass and are 112 mm×46 mm×1.0 mm in size. The bottom of the cover plate 44 is coated with a 5 µm thick anti-scattering film 45 of a mixture of epoxy resin with 5% of a black pigment (Glass Light 500 of cashew).

The functions and effects of the process of making holograms in Example 1 are the following.

In Example 1, three photosensitive layers 501 to 503 are arranged in the direction of the constructing beams (object beam 60 and reference beam 61) and the exposure is made.

Accordingly, the area where the constructing beams are illuminated in Example 1 is one third of the area where the constructing beams are illuminated onto three photosensitive layers arranged in a plane as is conventionally done. The power of the constructing beams is more uniform in the exposure plane in Example 1 than in the conventional process. Thus, the diffraction efficiencies of the obtained hologram elements are more uniform.

The directions of the interference fringes in the hologram elements are almost identical. The directions of the interference fringes in the hologram elements are slightly different in the vertical direction.

Nevertheless, the total thickness of the photosensitive plates 521 to 523 is about 1.8 mm, while the focal length of the lens 65 is 1000 mm. The difference of the images in the direction of the beams is less than 0.2%, which is quite small. If photosensitive films are used instead of the photosensitive plates 521 to 523, the thickness of the photosensitive film is about 50μm, so that the difference of the interference fringes can be negligible.

Although three photosensitive plates are used in Example 1, the number of photosensitive plates can be increased or decreased, depending on the transparency of the photosensitive plates and the power of the constructing beam.

Figure 10:
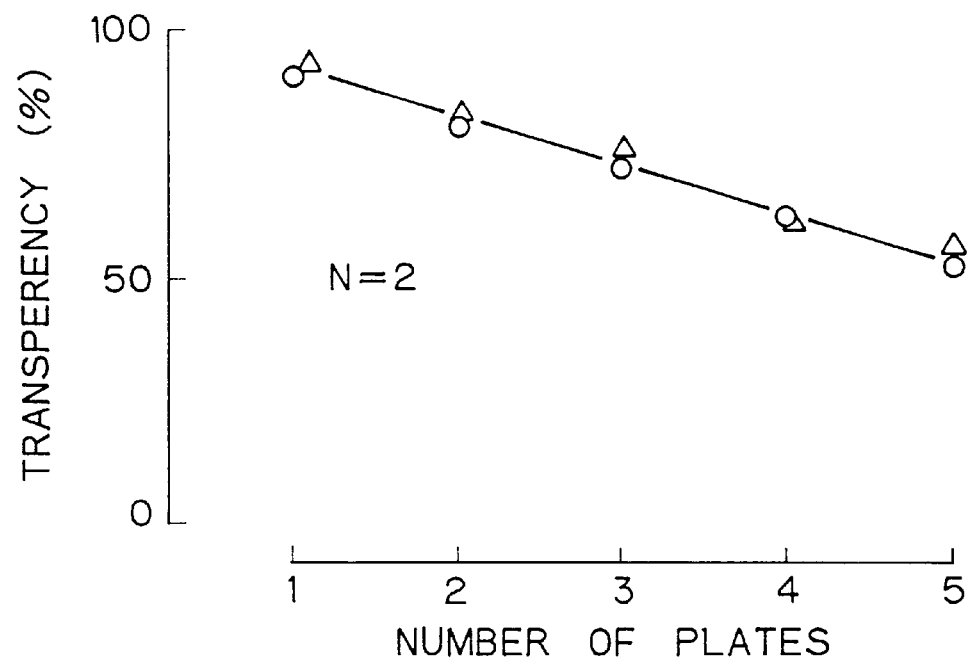
FIGS. 10 and 11 are graphs illustrating the diffracting characteristics of the hologram elements made using the process of the first aspect of the present invention.
Figure 11:
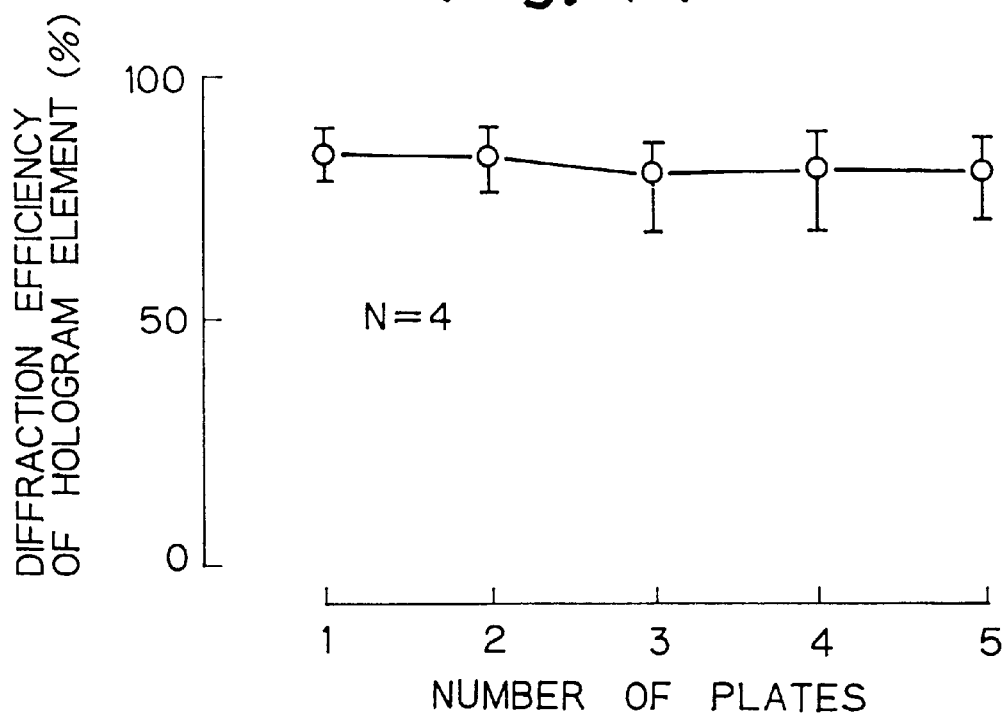

As an example, FIG. 10 shows the transparency of the photosensitive plates when the number of the arranged plates is varied from one to five. FIG. 11 shows the diffraction efficiency of the hologram elements made using the one to five plates arranged in a stack in the process as described above. FIG. 11 demonstrates that an excellent hologram element having a diffraction efficiency higher than 70% is obtained even if five plates are arranged in one exposure. FIG. 10 is for two samples and FIG. 11 is for four samples. In FIG. 11, the mark of white circle indicates an average and the bar mark indicates the variation in the sample.

Thus, in the process of this Example, a plurality of uniform hologram elements can be obtained by one exposure step.

Although dichromate gelatin is used in the above, other photosensitive materials such as photo-polymers, silver salts, etc., may also be used as long as they are transparent to the constructing beam. The substrate for supporting the photosensitive layer is not limited to soda glass, as long as it it transparent to the constructing beam. The lens 65 may be changed to other types such as a lens having a mirror surface of a paraboloid mirror, an elliptical mirror, a trocoidal mirror, etc.

Example 2

Figure 12:
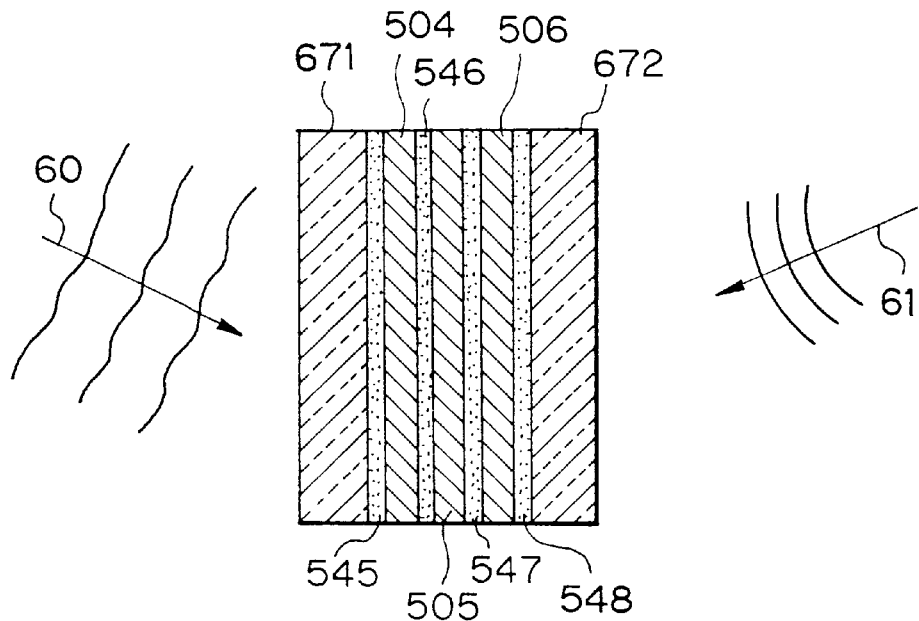
FIGS. 12 to 14 are sectional views showing other embodiments of the process of the first aspect of the present invention.

Referring to FIG. 12, in Example 2, photosensitive films 504 to 506 are substituted for the photosensitive plates 521 to 523 in Example 1, that is, the substrates 511 to 523 are not used. Transparent holders 671 and 672 sandwich the assembly of the three photosensitive films 504 to 506 and refractive index-adjusting liquids of silicone oil seal the interfaces of each of the photosensitive films 504 to 506. An object beam 60 is incident on the holder 671 from the left and a reference beam 61 is incident on the holder 672 from the right, so that holograms are formed in the photosensitive films 504 to 506.

The other points are the same as in Example 1.

The effects in Example 1 can be also obtained in Example 2.

In Example 2, the holders 671 and 672 may be changed to a prism 66 as used in Example 1.In FIG. 12, the object beam 60 passes through the photosensitive films 504 to 503 and internally reflected at the interface of the holder 672 with the exterior air to return into the photosensitive films 504 to 503 and form unnecessary interference fringes in the photosensitive films 504 to 503. By using a prism, the direction of the internal reflection can be changed so as not to return into the photosensitive films 504 to 503. The same can be applied to the reference beam 61 and the holder 671 can be replaced by a prism so that the returning beam from the holder-exterior interface into the photosensitive films 504 to 503 can be removed.

Example 3

Example 3 is an application of the invention to a Fresnel hologram element.

Figure 13:
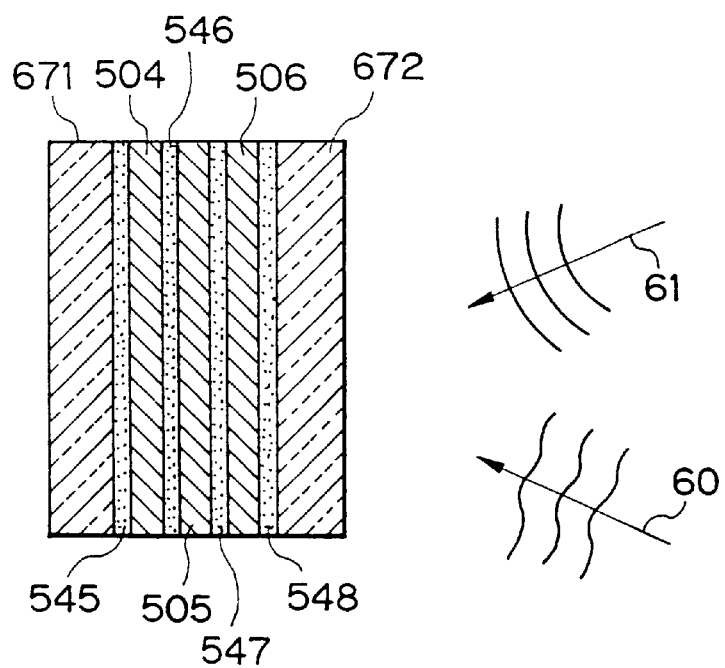

A Fresnel hologram element is made by illuminating both object and reference beams 60 and 61 onto photosensitive films 504 to 506 from the same side of the films, as shown in FIG. 13. The other points are the same as in Example 2.

The effects obtainable in Example 3 are the same as in Examples 1 and 2.

Example 4

Example 4 is an application of the invention to the making of Fresnel hologram elements by a contact exposure method.

Figure 14:
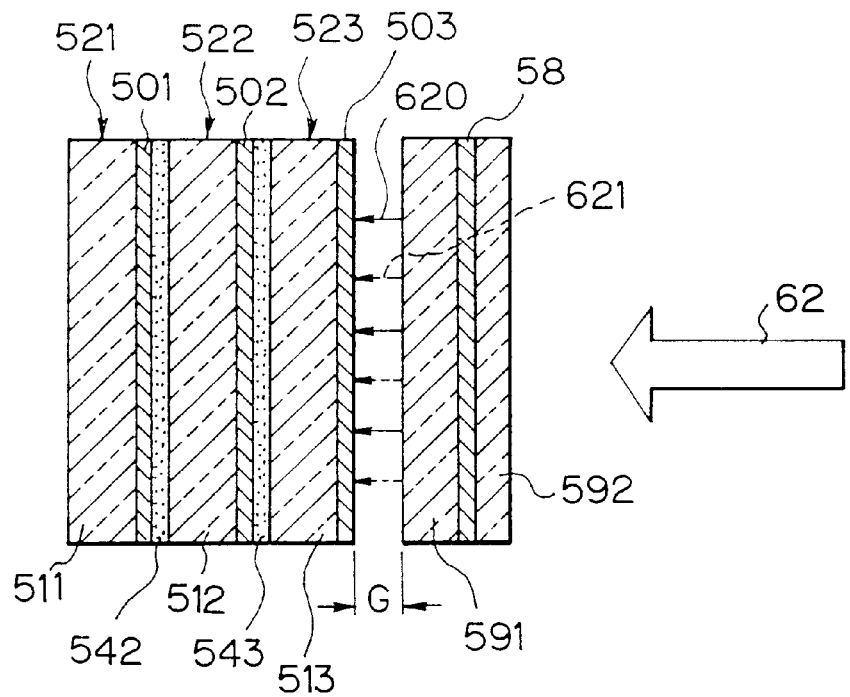

Referring to FIG. 14, a master hologram 58 is placed close to the photosensitive films 501 to 503.

The photosensitive films 501 to 503 are formed on the substrates 511 to 523 to form the photosensitive plates 521 to 523, which are assembled with refractive index-adjusting liquids 542 and 543 of silicon oil inserted therebetween. The master hologram 58 is sandwiched by holders 591 and 592. The gap G of the holder 591 and the rightest photosensitive layer 503 is selected to be 2 mm.

A laser beam 62 is incident on the master hologram 58, from the side opposite to the photosensitive plates 521 to 523, so that the zero-order beam 620, which has simply passed through and has not been diffracted by the master hologram 58, and the first-order beam 621, which has been diffracted by the master hologram 58, are incident on the photosensitive plates 521 to 523. The zero-order beam 620 as a reference beam and the first-order beam 621 as an object beam interfere in the photosensitive plates 521 to 523 to obtain hologram elements.

The other points are the same as in Examples 1 to 3 and the effects as in Examples 1 to 3 can be obtained in Example 4.

Example 5

Figure 6:
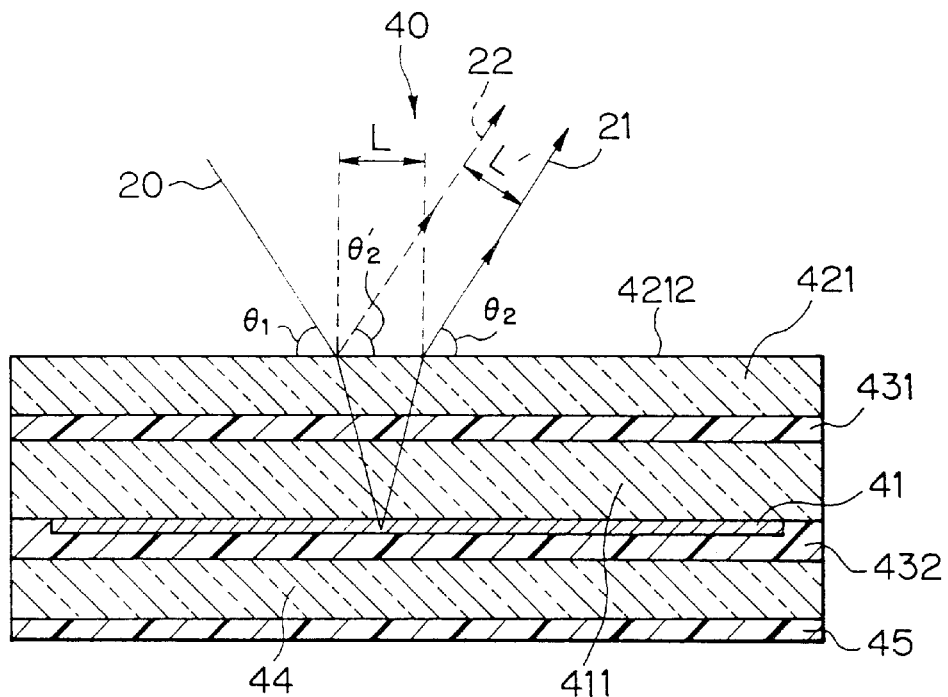
FIG. 6 is a sectional view of a hologram device according to a first aspect of the present invention.
Figure 15:
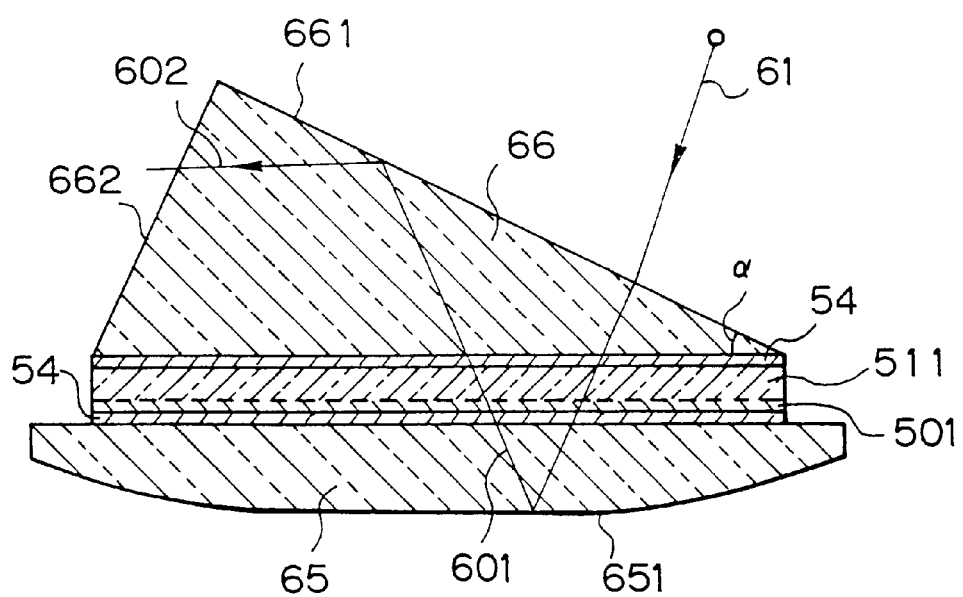
FIG. 15 is a sectional view of a process for making a hologram element of the second aspect of the present invention.

FIGS. 5, 6 and 15 are referred to. Example 5 relates to a holography device for a heads-up display.

Referring to FIG. 6, in the holography device 40, an incident beam 20 for a display image is diffracted and reflected by a hologram element 41 to emit a reconstructing beam 21, by which an image is created.

The holography device 40 comprises an upper cover plate 421 and a hologram element 41 disposed below the upper cover plate 421. The surface shape of the upper cover plate 421 is the same as a mirror surface having the reflection characteristic identical to the diffraction and reflection characteristic of the hologram element 41. In this case, the reflection characteristic of the hologram element 41 is the same as a concave mirror.

More specifically, in the holography device 40, the hologram element 41 is formed on the bottom of glass substrate 411. The upper cover plate 421 is adhered to the glass substrate 411 with a sealant 431 therebetween. A lower cover plate 44 is adhered to the hologram element 41 with a sealant 432 therebetween. An anti-scattering film 45 is provided on the bottom of the lower cover plate 44. The hologram element 41, upper and lower cover plates 421 and 44, glass substrate 411 and sealants 431 and 432 are selected to have almost the same refractive index.

The hologram element 41 is made by exposing a photosensitive material to a light beam, and has interference fringes on the surface thereof by which a recorded medium is recorded on. The recorded medium is a concave mirror as an enlarging mirror, as described later. The hologram element 41 has interference fringes with two pitches of 290 nm and 320 nm. These pitches of the interference fringes determine the selected wavelength of diffraction. Namely, two types of interference fringes with a curvature are recorded in the hologram element 41 so as to record combined information of a concave mirror and colors. such interference fringes with two pitches can be formed by varying the wavelength and incident angle of the incident beam on the photosensitive material.

The incident surface 4212 of the upper cover plate 421 is machined to have a curvature identical to that of the concave mirror recorded in the hologram element 41.

The hologram element was made by the following process.

Referring to FIG. 15, a layer of dichromate gelatin (D.C.G.) with a thickness of 10 to 40 $\mu$m, particularly 25 $\mu$m, as a photosensitive layer 501 was formed on a glass substrate 411 of soda glass (112 mm×46 mm×1.8 mm; a refractive index of 1.52). The dichromate gelatin (D.C.G.) was a solution of ammonium dichromate in a 4%-gelatin solution and has a refractive index of 1.55. The photosensitive layer 501 was gelled or dried and then stabilized in a dry oven at about 20° C. and 50% RH for 72 hours.

Here, a concave mirror as an enlarging mirror was recorded, developed and dried in the photosensitive layer 501. The glass substrate 411 with the photosensitive layer 501 is sandwiched by a convex lens 65 having a certain focal length and a prism 66 with silicone oils as refractive index-adjusting liquids 54 therebetween. An argon laser beam with a wavelength of 514.5 nm as an incident beam 61 is incident on the prism 66. The incident beam 61 propagates straight forward toward the lens 65 due to the almost identical diffraction indexes of the components, and reflected by a reflecting film 651 formed on the outer surface of the lens 65. The reflected beam 601 as an object beam 60 and the incident bream as a reference beam 61 overlap and create interference fringes in the photosensitive layer 501.

The reflected beam 601 is not reflected by the glass substrate 511 and is incident on and passes through the prism 66 because of the presence of the refractive index-adjusting liquid 54, and then partially reflected by the incident surface 661 of the prism 66. Here, the angle α of the prism 66 is selected so that the beam 602 reflected by the incident surface 661 of the prism 66 does not go toward the photosensitive layer 401. With this type of prism, a noise image due to the reflection beam 602 can be prevented. Also, with provision of a black coating on the side surface 662 of the prism 66, a reflection of the beam 602 at the side surface 662 toward the photosensitive layer 401 can be prevented.

The incident laser beam or constructing beam 61 was an argon laser beam with a wavelength of 514.5 nm and incident on the photosensitive layer 501 at such incident angles that the reconstructing beam of the photosensitive layer 501 when illuminated by an incident beam at an incident angle of 33.5° would have two colors of 540 nm and 600 nm. The total laser power of the exposure laser beams was 500 mJ. The focal length of the lens 16 was 1000 mm.

The exposed photosensitive layer 501 on the glass substrate 511 (the photosensitive plate) was cleaned with water until the color disappears, and then immersed in a commercially available fixing solution for photography (Rapid fixer by Kodak) for 10 minutes. After cleaning with water again, the plate was immersed in a 90%-isopropanol solution for 10 minutes and dried with a hot air. Thereafter, the plate was thermally aged at 150° C. for 4 hours so that the wavelength characteristic of the hologram element will not be varied in an actual automobile.

Figure 7:
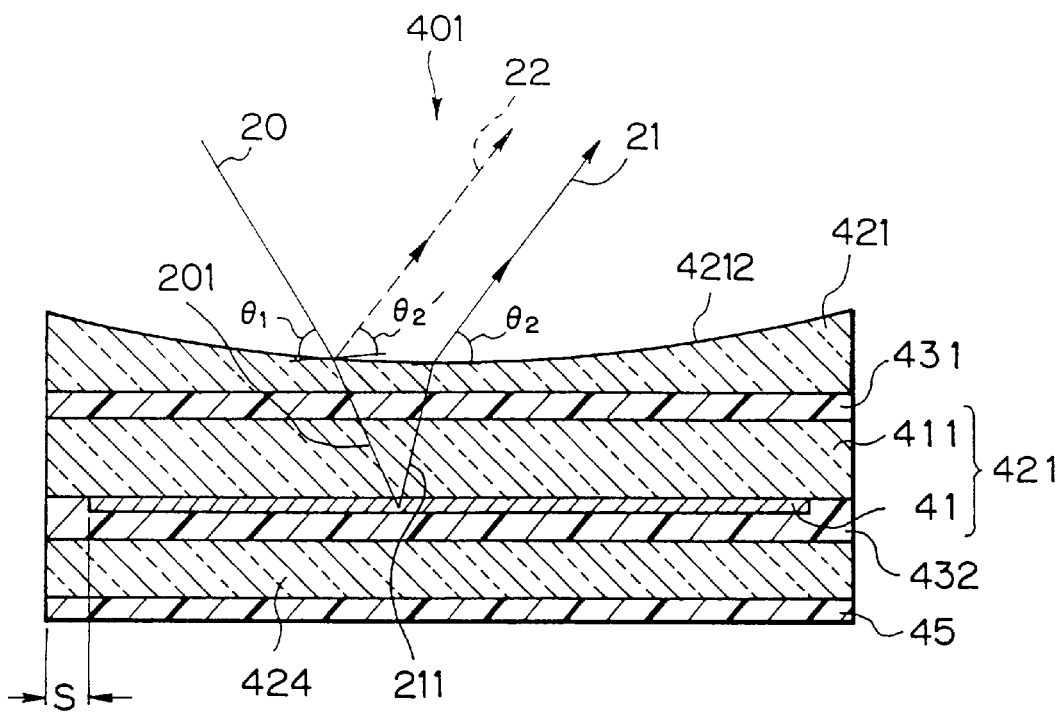
FIG. 7 is a sectional view of a hologram device according to a second aspect of the present invention.

Referring to FIG. 7, the periphery of the hologram element 41 was removed to make the width S of the sealing 5 mm. The upper cover plate 421 had a concave top surface identical to the convex surface of the convex lens 65 as shown in FIG. 15, and had sizes of 112 mm×46 mm×1.0 mm. The lower cover plate 424 had sizes of 112 mm×46 mm×1.0 mm and had an anti-scattering film 45 of a mixture of epoxy resin with 5% of a black pigment (Glass Light 500 of cashew), 10 $\mu$m thick.

Sealants 431 and 432 of an epoxy-based thermally setting resin (CS-2340-5 by Cemedye corp.) having a refractive index of 1.55 were coated on the surface of the cover plates 421 and 424, to have a thickness of 50 $\mu$m. The cover plates 421 and 424 were arranged with the hologram plate or the glass substrate 411 as shown in FIG. 6 and cured.

In the holography device of Example 5, the incident surface 4212 of the upper cover plate 421 has a shape identical to that of a mirror surface (equivalent mirror surface) having the same reflection characteristic as the diffraction and reflection characteristic of the hologram element 41. As a result, the emitting angle $\theta_2$ (in relation to the horizontal plane) of the reconstructing beam 21 is the same as the reflecting angel $\theta_2$ (in relation to the horizontal plane) of the surface reflecting beam 22, as shown in FIG. 7. Thus, the reconstructing beam 21 and the surface reflecting beam 22 are parallel beams so that the surface reflecting noise image and the normal image or reconstructing image overlap with each other. Accordingly, the surface reflecting noise image does not act to disturb the normal image.

Figure 2:
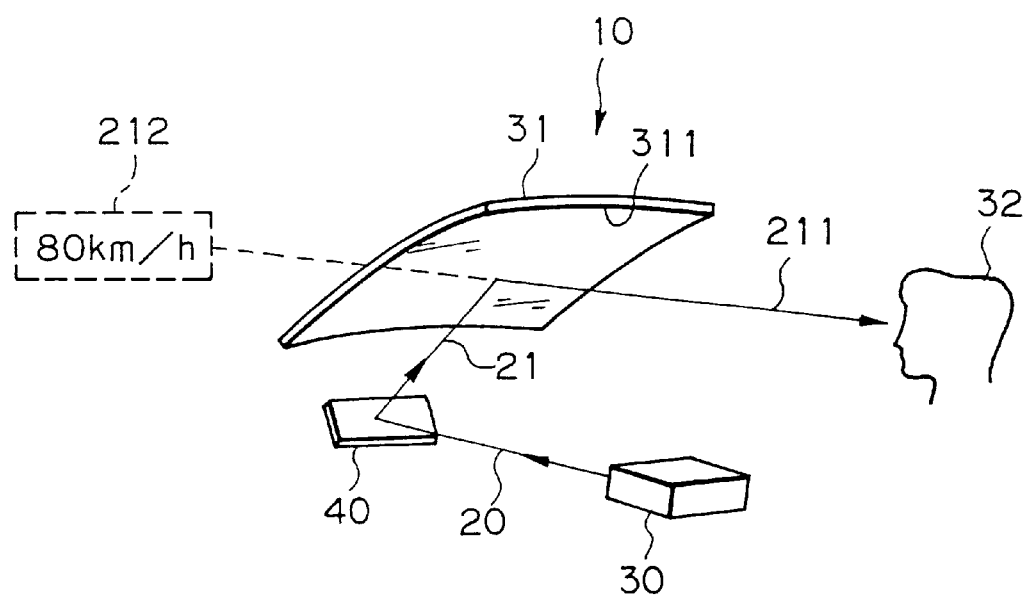
FIG. 2 shows head-up display.
Figure 3:
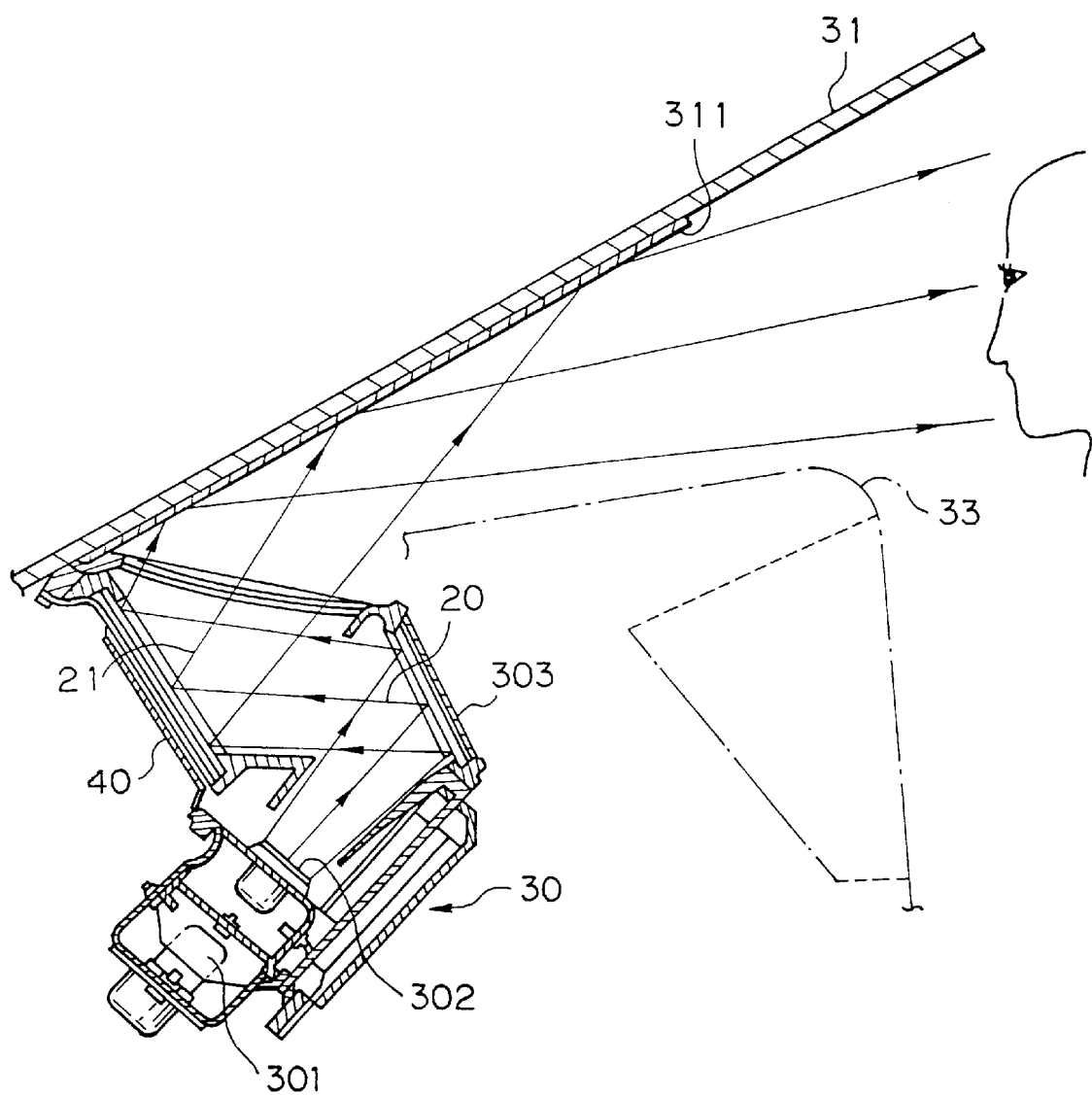
FIG. 3 is a sectional side view of a head-up display device.

The equivalent mirror surface of the hologram element is a concave mirror, so that it acts as an enlarging mirror. Therefore, when it is applied to a head-up display, a driver 32 can view an enlarged image 212 (FIG. 2).

Example 6

Example 6 is directed to an example similar to Example 5 provided that the upper cover plate is in the form of a sheet having a uniform thickness.

Figure 16:
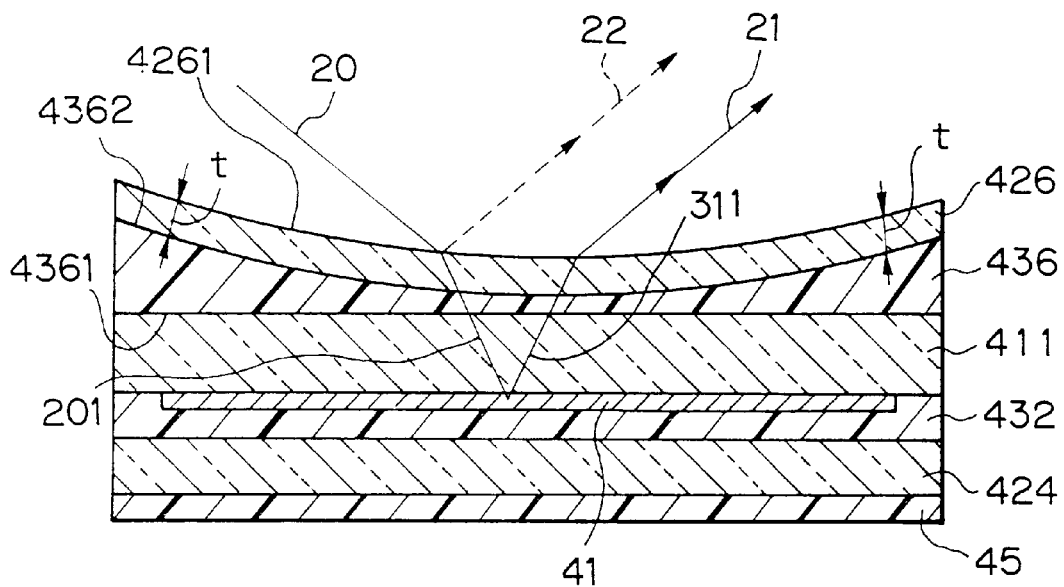
FIG. 16 is a sectional view of another embodiment of a hologram element in accordance with the second aspect of the present invention.

Referring to FIG. 16, the upper cover plate 426 is in the form of a sheet having a uniform thickness t. The upper sealant 436 has an non-uniform thickness, i.e., the upper sealant 436 has a flat lower surface 4361 and a concave top surface 4362. Thus, the upper surface 436 of the upper sealant 436 and the incident surface 4261 of the upper cover plate 426 have a curvature identical to that of an equivalent concave mirror having the same reflection characteristic as that of hologram element 41.

The other points are the same as in Example 5.

The same effects as in Example 5 can be obtained in Example 5.

Example 7

Example 7 relates to a process for making a hologram element in which the reconstructing wavelength resides in a longer wavelength band and is stabilized.

In a process of making a hologram element comprising exposing a hologran plate with a dichromate gelatin layer, baking and developing the same, the hologram plate, prior to the exposure, is kept in a vacuum for a certain time period and is optically sealed with optical components with a refractive index-adjusting liquid in the vacuum. The dichromate gelatin layer is preferably a dichromate gelatin layer cured with a trivalent chromium-containing carbnate as a curing agent to a certain hardness prior to the exposure. By optically sealing the hologram plate and the optical components in a vacuum, the dichromate gelatin layer is shrunk to have a thin thickness. By exposing this dichromate gelatin layer, the wavelength of the recorded hologram is shifted toward a longer wavelength in comparison with that when sealed in a normal atmosphere. The degree of the shift is in relation to the degree of the vacuum.

In the prior art, the shifting of a reconstructing wave toward a longer wavelength is attained by making the incident angle of the exposure smaller or by lowering the temperature of the thermal aging after the exposure. Nevertheless, making the exposure angle smaller is limited by an increasing surface reflection. The lowering of the temperature of the thermal aging results in a change of the reconstructing wavelength when the hologram element is used at a high temperature for a long time. The process of Example 7 allows the above prior art problems to be solved.

Figure 17:
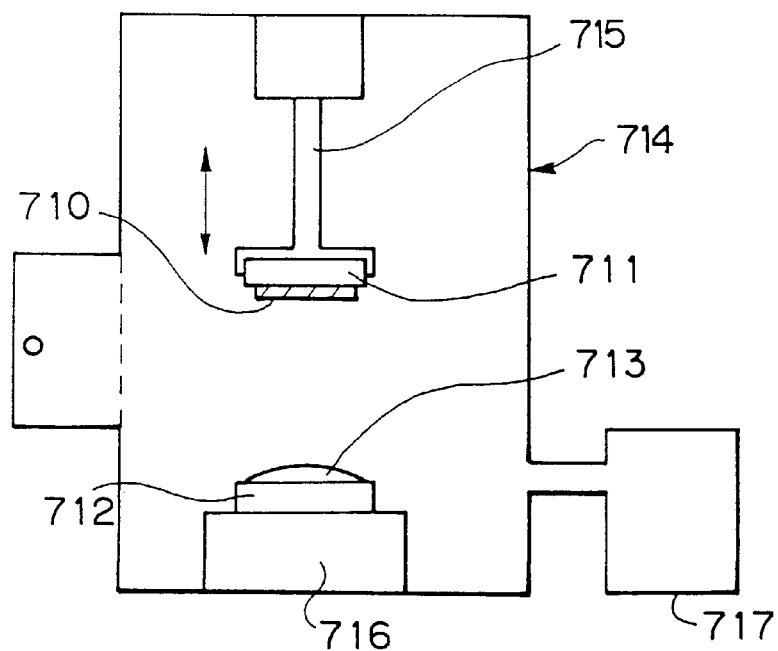
FIG. 17 shows the step of sealing in a preferred embodiment.

More specifically, referring to FIG. 17, a hologram plate 711 with a dichromate gelatin layer 710 and an optical component 712 are set in a vacuum chamber 714 and a refractive index-adjusting liquid 713 is dropped on the optical component 712. The vacuum chamber 714 is closed and evacuated by a vacuum pump 717. After being evacuated for a certain time period, a cylinder 715 is driven in the direction of the arrow in a vacuum of about 0.1 mmHg, so that the hologram plate 711 is brought into contact with the optical component 712 over a sample table 716. A nitrogen gas is then introduced into the chamber 714 and the obtained assembly of the hologram plate and optical component sealed with each other is removed.

The hologram element 70 of the removed assembly is then exposed.

Figure 18:
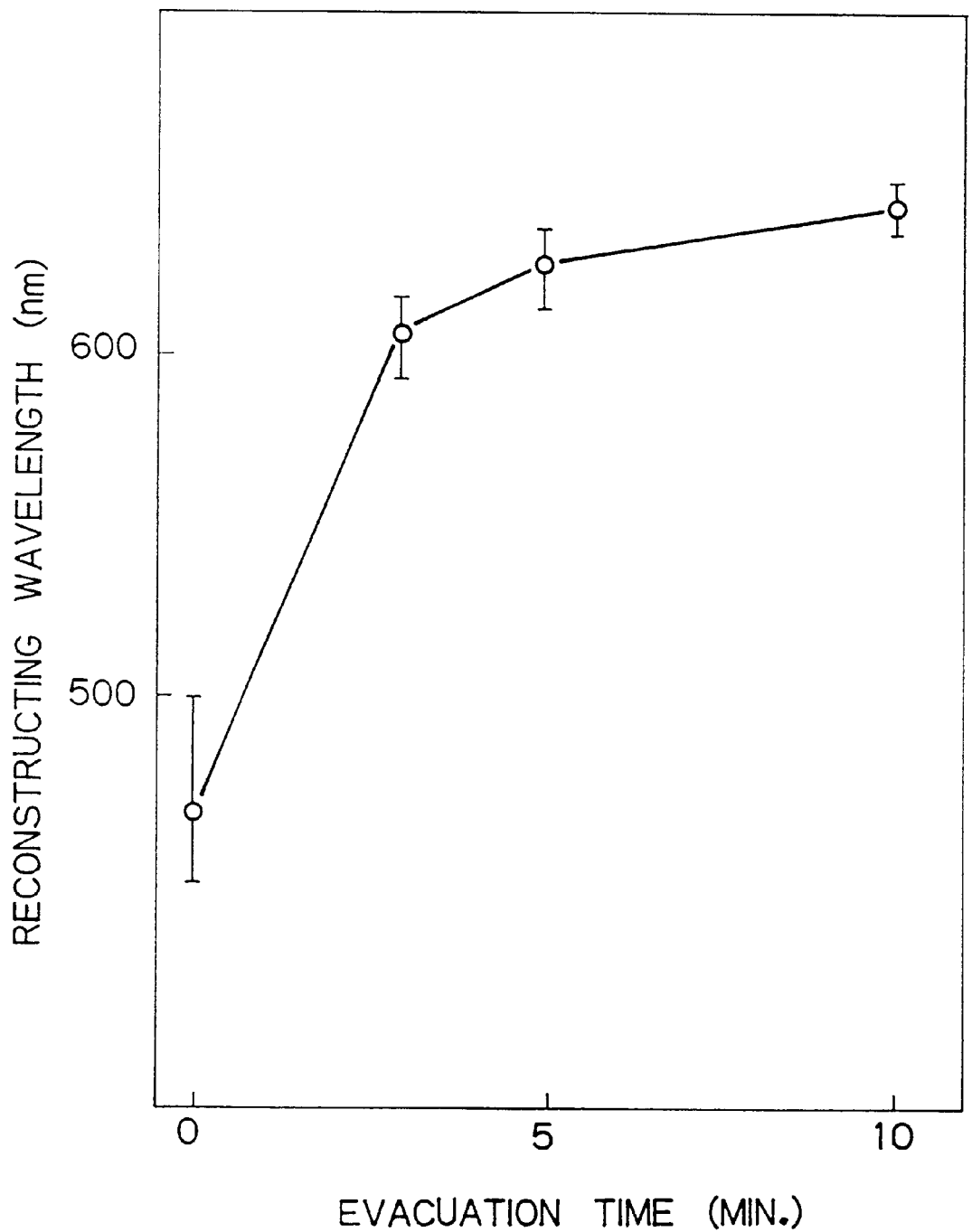
FIG. 18 shows the diffraction wavelength of a hologram element made using the step of sealing in the above preferred embodiment.

FIG. 18 shows the reconstructing wavelength of the hologram element in relation to the time period of the evacuation in the process as described above. It is shown that the reconstructing wavelength of the hologram element becomes longer as the evacuation time period is elongated.

Figure 19:
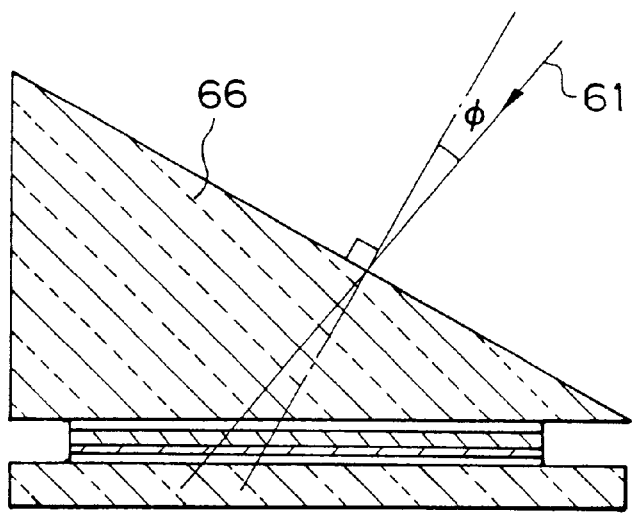
FIG. 19 is a sectional view showing a step of exposure using a prism.

Referring to FIG. 19, it is preferred that a prism 66 is used to make the incident angle φ of the incident beam 61 small, so that a surface reflection at the interface of the optical component and the air can be reduced.

The dichromate gelatin layer is cured using a trivalent chromium-containing carbonate as a curing agent. The curing may be conducted by air drying in a normal atmosphere or by irradiation.

When a dry plate and an optical component are sealed in a vacuum, as above, it is not necessary to conduct the thermal aging at a lower temperature after the exposure and therefore the variation of the wavelength of the reconstructing wave when time lapses can be prevented. It is also advantageous that sealing in a vacuum allows a constant atmosphere such as temperature and humidity during the sealing so that the reconstructing wavelength and diffraction efficiency are stabilized.

The other points are similar to Examples 5 and 6 and the same effects as in Examples 5 and 6 can be obtained in Example 7. It is noted that the process as described in Example 7 is not limited to the hologram elements in Examples 5 to 7 and can be applied to general hologram elements.

Example 8

This Example relates to an improvement in the thermal treatment step after the exposure to obtain an excellent hologram element.

The spectral distribution of the hologram element required in a holography device is different depending on the purpose of the holography device. Some holography devices require a uniform spectral distribution, but a heads-up display requires a monochromatic or selective spectral distribution. In the latter, the selectivity of the reconstructing wavelength should be increased, the selected wavelength should be narrowed and stabilized, and the dispersion of the characteristic of the reconstructing wavelength among hologram elements should be lowered.

On the other hand, a hologram element is made by exposing a dichromate gelatin layer of a hologram plate to a constructing beam, immersing it in water and then in an organic medium, drying it and heat treating it (see JP-B-61-29508). The heat treatment step has a great effect on the wavelength selectivity of a hologram element.

Figure 20:
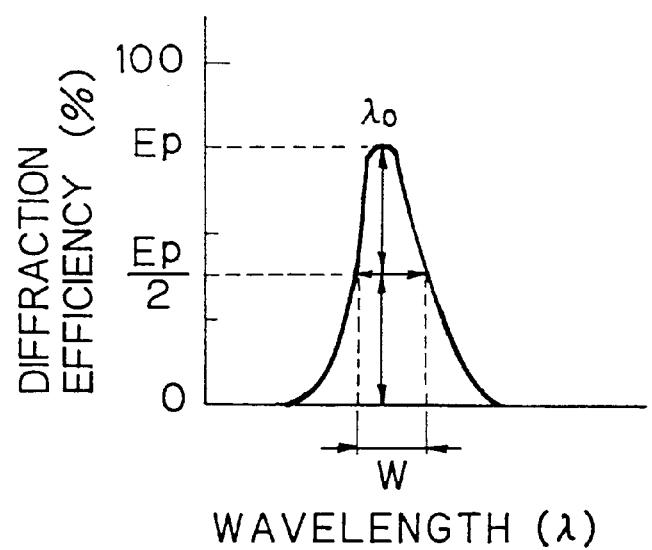
FIG. 20 explains the half maximum width of the diffraction efficiency.
Figure 21A:
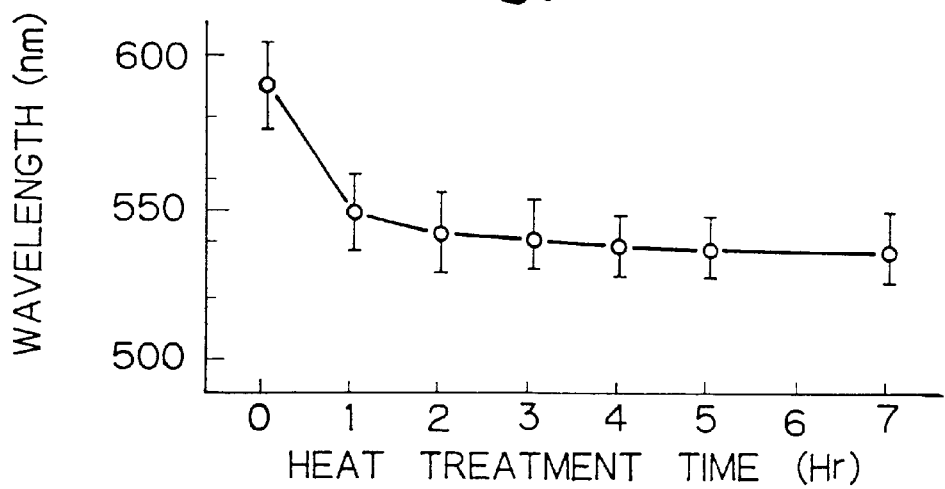
FIGS. 21A to 21C are graghs illustrating the effects of a step of heat treatment of a hologram element after the exposure.
Figure 21B:
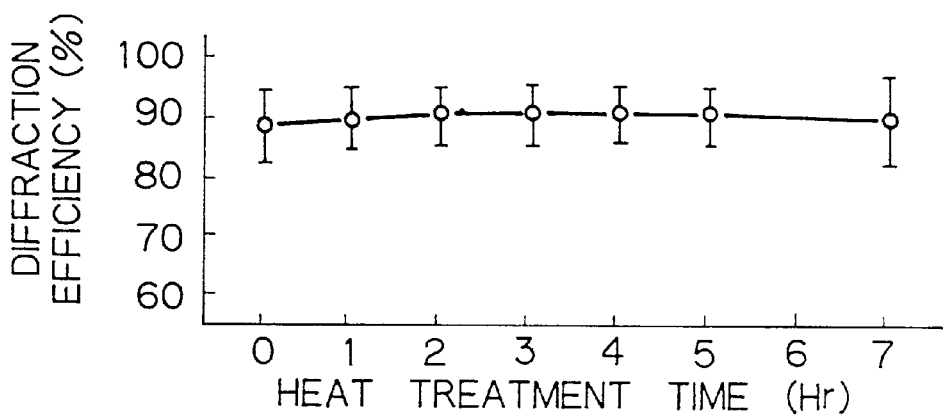
Figure 21C:
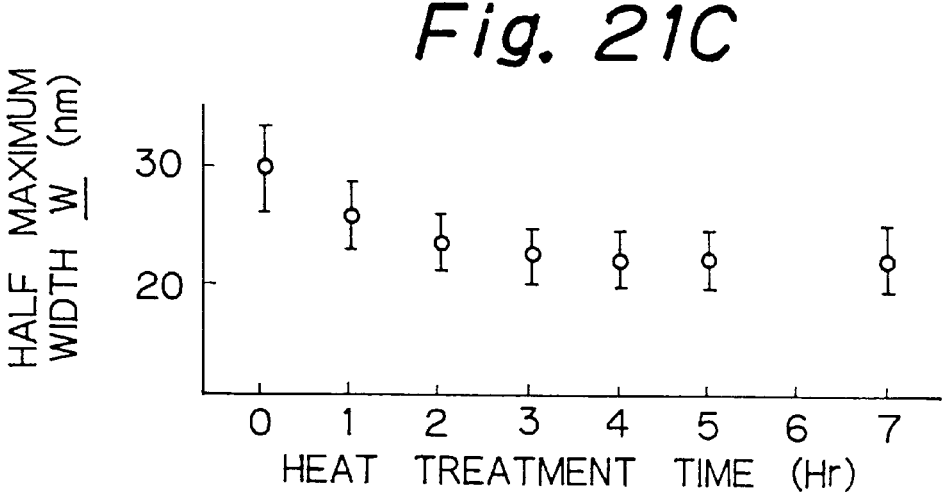

Referring to FIG. 20, a wavelength region (half maximum wavelength region) where the diffraction efficiency is half of the maximum diffraction efficiency $E_p$ is considered. FIGS. 21A to 21C show the relationships of the above wavelength region and the heat treatment time period. FIGS. 21A to 21C were obtained from the heat treatment at 150° C., but the photosensitive layer may be heat treated at a temperature range in which the photosensitive layer is not burnt, for example, a dichromate gelatin layer may be heat treated at 100 to 170° C.

FIGS. 21A to 21C show that the wavelength of the reconstructing wave becomes constant or stabilized after a heat treatment for 3 to 4 hours; the diffraction efficiency will hardly vary with time; and the half maximum width W tends to be shortened along with an increase in the heating time, i.e., the selectivity is increased. Also, the heat treatment improves the thermal stability and therefore the reliability of a hologram element.

The hologram elements are made by simultaneously heat treating several hologram plates after the exposure. Among the several hologram plates, a sample hologram plate is selected and the diffraction characteristic of the sample hologram plate is observed during the simultaneous heat treating of the several hologram plates.

Figure 22:
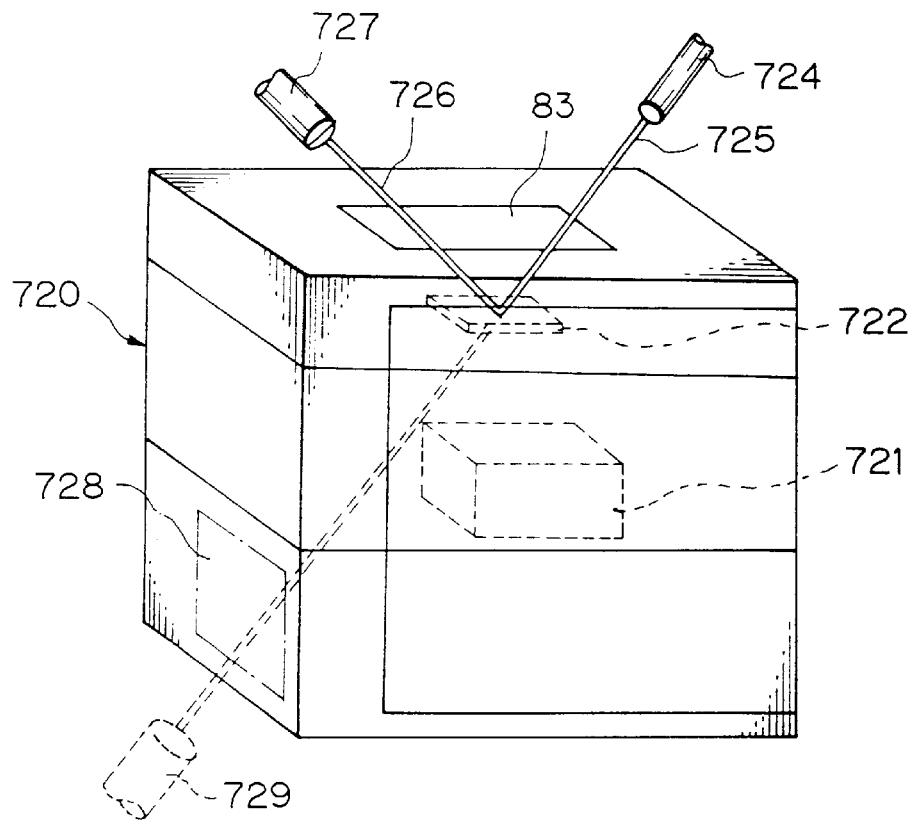
FIGS. 22 and 23 are perspective views showing the heat treatment step while the diffraction characteristic of the hologram elements is monitored.

More specifically, referring to FIG. 22, several hologram plates 721 which were made from the coating of a dichromate gelatin layer to the exposure in the same manner are set in a thermostatic chamber 720 so as to simultaneously heat treat the hologram plates 721. A sample hologram plate 722 is set above the hologram plates 721 in the chamber 720. An inspection window 723 is provided above the sample hologram plate 722 and the sample hologram plate 722 is illuminated with a continuous wave of white light (for example, xenon lamp light). The diffracted beam 726 diffracted and reflected by the sample hologram plate 722 is detected by a sensor 727. The detected light is analyzed by a spectrometer, a photometer, etc., to evaluate the diffraction and reflection characteristics. The heat treatment is carried out while the above analysis is being conducted. The sample hologram plate 722 and the hologram plates 721 are placed as near as possible so as to make the heat treatment conditions thereof substantially identical.

The above holograms are a reflecting type. If the holograms are transmission type, referring to FIG. 22, an inspection window 728 and a sensor 729 are provided below as indicated by the doted line. The inspection window 723 or 728 is preferably coated with an anti-reflecting film or is a member which has as low a reflection as possible.

The data obtained from the analyzers may be processed by a computer so that continuous changes or statistical data may be obtained.

By observing the characteristics of the hologram elements being heat treated, the heat treatment can be effectively controlled and uniform excellent hologram elements with uniform diffraction characteristics can be obtained.

The other points are the same as in Examples 5 to and the process of Example 8 can be applied to general holograms.

Example 9

In this Example, all hologram elements are inspected and analyzed while they are being heat treated.

Figure 23:
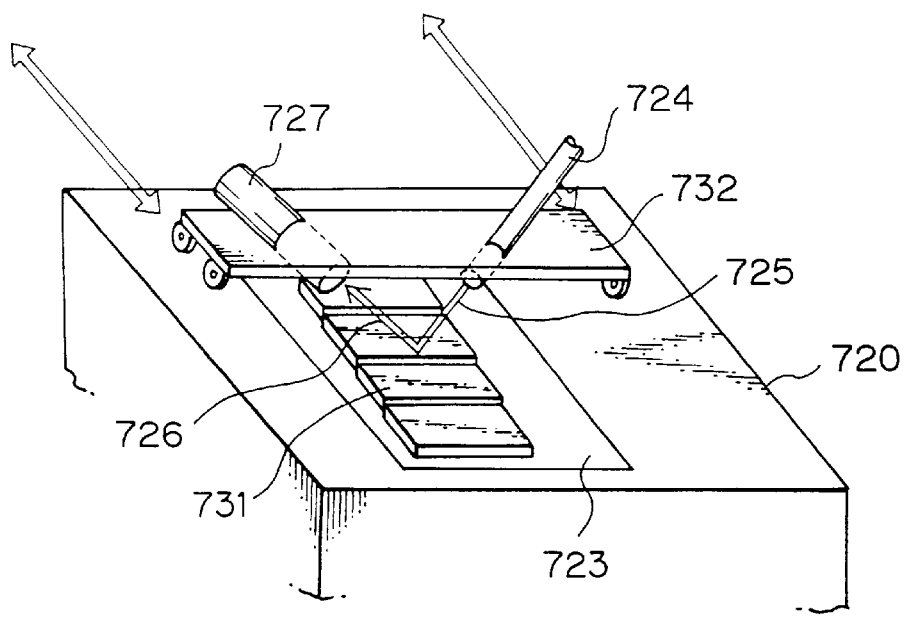

More specifically, referring to FIG. 23, hologram plates 731 after the exposure and development steps are arranged in parallel in a thermostatic chamber 720, in which an inspection window 723 is provided. A moving table 732 on which an illumination member 724 and a sensor 727 are mounted is arranged over the inspection window 723. While the table 732 is moved, a continous wave of white light 725 is successively illuminated onto the hologram plates 731 and the diffracted light 726 is received by the sensor 727 and analyzed.

Thus, every dry plate being heat treated is analyzed, so that more accurate data for each hologram plate can be obtained, in comparison with the case of the analysis of a sample hologram plate as in Example 8. If actuators such as robot hands are provided and hologram plates are removed when reaching an optimum characteristic, the uniformity of the characteristics of the holograms may be further increased.

The other points are the same as in Example 8.

Example 10

It is noted that a portion of an image to be reconstructed by the periphery of a conventional hologram element in which a concave mirror, for example, is recorded is fuzzy. The inventors investigated the reasons therefore and discovered that when reconstruction or reproduction is carried out, since the wavelength of the light source and the reflection wavelength of the hologram element have a certain width, the scattering of light at the periphery of the hologram element causes the direction of the reflection to be different for different wavelengths, so that the image becomes fuzzy due to the wavelength width.

Figure 24:
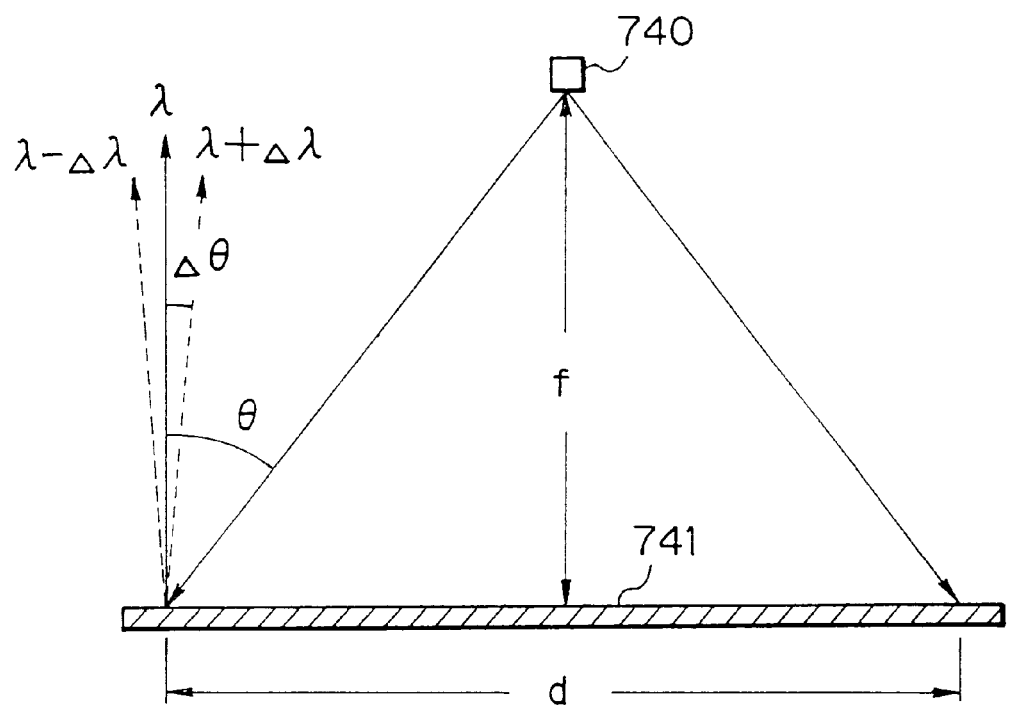
FIG. 24 explains the chromatic abberations at the periphery of a hologram element.

More specifically, referring to FIG. 24, the causes of the fuzzy image or the chromatic aberration include the width $\Delta \lambda$ of the diffraction wavelength of a hologram element, the focal length f of a lens recorded in the hologram element, and the size d of the hologram element. The chromatic aberration increases, as $\Delta \lambda$ increases, f decreases, and d increases. In FIG. 24, 740 denotes an optical source and 741 denotes a hologram element.

The inventors also discovered that the affect of the above chromatic aberration can be prevented by the constitution as shown in FIG. 7. In the holography device as shown in FIG. 7, the shape of the upper cover plate 421 is selected to be identical to the diffraction and reflection characteristic of the hologram 41, so that the incident angle $\theta_1$ and emitting angle $\theta_2$ as well as the incident angle $\theta_1$ and the surface reflecting angle $\theta_2'$ are made substantially the same, to thereby eliminate the effect of the chromatic aberration.

Further, it is possible that the exposure of a hologram element may include a modification for correcting the chromatic aberration and the shape of the upper cover plate 421 is made to be adapted to the modification.

Figure 25:
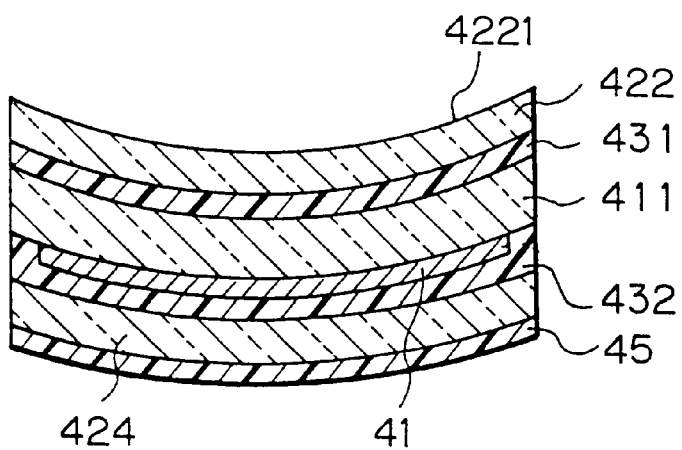
FIG. 25 is a sectional view showing a holography device in which the chromatic abberations at the periphery of a hologram element are prevented.

Moreover, the same effect as above can be obtained by the holography device as a whole being bent so that the cover plate has a concave shape, as shown in FIG. 25. In FIG. 25, similar optical components are indicated by the same reference numbers. 422 denotes an upper cover plate and 4221 denotes a top surface of the upper cover plate 422.

Example 11

Figure 26:
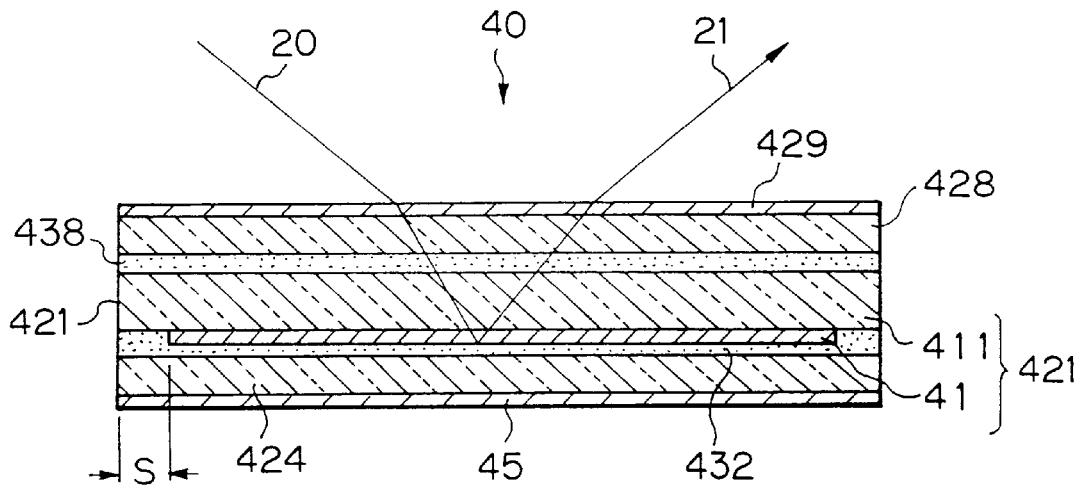
FIG. 26 is a sectional view showing a holography device of the third aspect of the present invention.

A holography device of this Example is shown in FIG. 26. This holography device is similar to the holography device of Example 5, and is made in the same manner as described in Example 5, except that the upper cover plate 428 is in the form of a planer sheet, not having a concave surface, an anti-reflecting film 429 is provided on the top surface of the upper cover plate 428, and sealants 438 and 432 are a liquid material containing at least two components which are different from each other in one or both of viscosity and refractive index thereof.

The upper cover plate 428 has a size of 112 mm×46 mm×1.0 mm and an anti-reflecting film 429 composed of four layers of alternate $MgF_2$ and $TiO_2$ layers having an apparent percent reflection of 0.3% is coated on the surface of the upper cover plate 428.

The liquid sealants 438 and 432 are a mixture of a commercially available low refractive index silicone oil (KF56 by Shin-etsu Chemical Industries, with a viscosity of 10 cP at 25° C., and a refractive index of 1.498) and a commercially available highly refractive index silicone oil (HIVACF-4 by Shin-etsu Chemical Industries, with a viscosity of 37 cP at 25° C., and a refractive index of 1.555). The mixing ratio of the above two silicone oils is 60:40 by weight so that the refractive index becomes 1.52, identical to that of the glass substrate 411. The viscosity of the mixture is 19 cP at 25° C.

Figure 27:
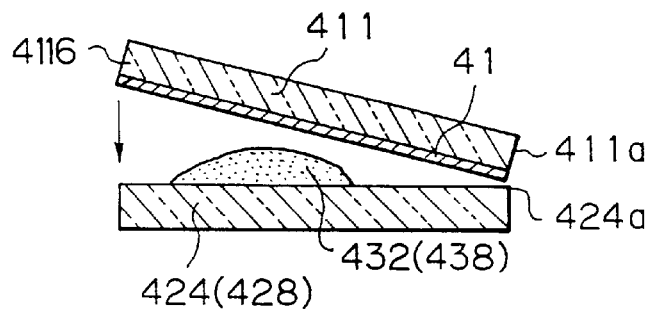
FIG. 27 is a sectional view showing a step of sealing a hologram plate and a cover plate with a liquid sealant.

Referring to FIG. 27, a sealant 432 of the above liquid mixture in an amount of 20 cm³ is placed on the lower cover plate 424. The hologram plate is set with the lower cover plate 424 so one end 411a of the hologram plate is in contact with an end 424a of the lower cover plate 424, then the other end 411b of the hologram plate is gradually lowered at a rate of 10 mm/min to assemble them.

The upper cover plate 428 is similarly assembled with the hologram plate with the sealant inserted therebetween.

Figure 28:
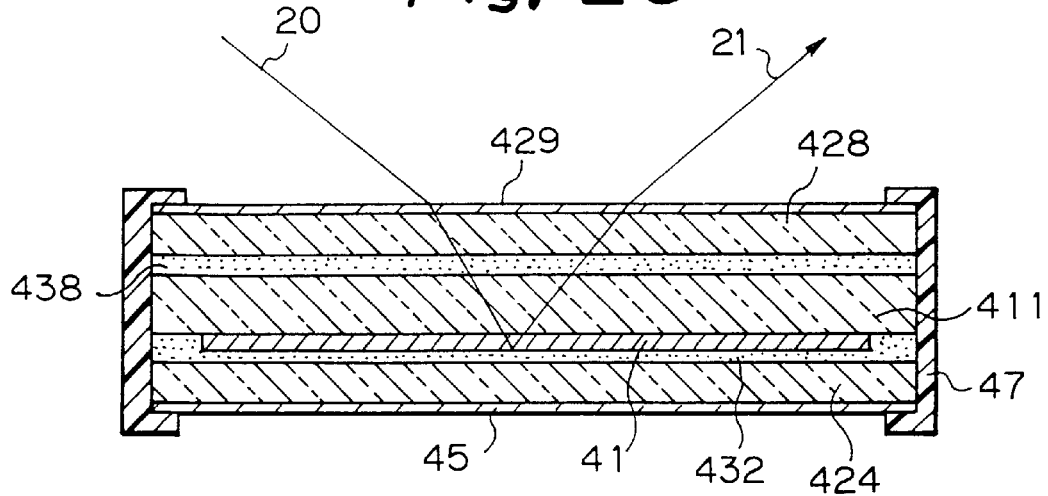
FIG. 28 is a sectional view showing a modification of the hologram device of FIG. 26.

The holography device 40 may be fixed by a casing 47 of a resin, if necessary, as shown in FIG. 28.

In the holography device of Example 11, the interfaces of the hologram plate 421 with the upper or lower cover plates 428 and 424 are sealed with a liquid sealant 438 or 432 comprising silicone oils. The refractive index of the sealant 438 or 432 can be easily controlled by changing the mixing ratio of the different silicone oils. It is therefore easy to match the refractive index of the sealant with those of the hologram plate 421 and the cover plates 438 and 432.

With liquid silicone oils, the viscosity of the sealant is extremely low. Specifically, the viscosity of the above mixture of the two silicone oils is 19 cP at 25° C. In contrast, a conventional epoxy resin-based sealant has a viscosity of 500 cP. As a result, with the liquid sealant in Example 11, air bubbles are not entrained in the sealant during the sealing.

Also, since a curing treatment is not effected for the silicone oil sealant, deterioration of the photosensitive material of the hologram element is not caused.

Comparative experiments were conducted for the liquid sealant and a conventional resin sealant. The resin sealant was an epoxy resin-based thermosetting type sealant (CS-2340-5 by Cemedye), which was coated to a thickness of 50 μm and cured at 120° C. for 30 minutes.

Table 1 shows the characteristics of the silicone oil sealant and the epoxy resin-based sealant.

TABLE 1

|  | Silicone oil | Epoxy resin |
| --- | --- | --- |
| Viscosity | 10 cP at 25° C. | 500 cP at 25° C. |
| Refractive index | 1.42–1.58, optional | 1.55, fixed |
| Curing treatment | non | Thermosetting |
| Effects on photosensitive medium | No reaction heat, no reactivity | Reaction heat, reactivity |

The characteristics such as the noise rate and air entraining of the holography device using the liquid sealant and conventional resin sealant are shown in Table 2.

The air entaining was evaluated by counting the number of air bubbles for 40 devices and the noise rate was determined by a ratio of the noise image brightness to the normal image brightness in percent. Also, apparent defects were inspected.

Sample no. 1 corresponds to Example 11 and sample no. 2 corresponds to the comparative example.

TABLE 2

| Sample no. | Air entraining | Noise rate | Apparent defects |
| --- | --- | --- | --- |
| 1 | 0/40 | 0.1% | No |
| 2 | 12/40 | 0.3% | 5 peeling-off/40 devices |
| 3 | 0/40 | 0.5% | No |
| 4 | 16/40 | 0.8% | 15 peeling-off/40 devices 30 partial cloud/40 devices |

As shown above, in accordance with Example 11, a holography device in which the refractive index matching is easy and the deterioration of the photosensitive material is prevented can be provided. The silicone oils do not absorb water, which adds an effect that the photosensitive material such as dichromater gelatin is protected from humidity.

In Example 11, the substrate and cover plates may be transparent resins or films. The holography device can be applied to uses other than the head-up display for an automobile. The recorded medium in the hologram element may be other optical elements or three dimensional images. The constitution of the device may be varied, for example, in the number or shape of the hologram elements or substrates.

Example 12

Example 12 is similar to Example 11, except that a commercially available photo-polymer (HR-700 by Dupont) is used for the photosensitive medium of the hologram element.

A commercially available photo-polymer was applied onto a substrate and the cover of the photo-polymer was removed to leave only the photo-polymer on the substrate.

The exposure was effected as in Example 11, to create interference fringes with a pitch of 290 nm. The photo-polymer was stabilized by UV irradiation at a total energy of 6 J. The sealants were the same silicone oils. The other points are the same as in Example 11.

The results are shown in Table 2. Sample no. 3 corresponds to Example 12 and sample no. 4 corresponds to a comparative example of Example 12 in which example 12 was repeated but the sealant was the same epoxy resin as used in the comparative example of Example 11.

As is shown in Table 2, the characteristics of the hologram device in Example 12 are remarkably improved in comparison with the conventional device.

In Examples 11 and 12, a hologram element other than the photosensitive materials, such as a relief, i.e., a work piece processed with a photo-resist to form surface fringe patterns, may be also applied to Examples 5 to 12. In place of silicone oil, other low viscosity liquids such as butyl phthalate (a viscosity of 10 cP, a refractive index of 1.49) and xylene which allows the refractive index to be easily controlled by mixing, may be used.

Figure 29:
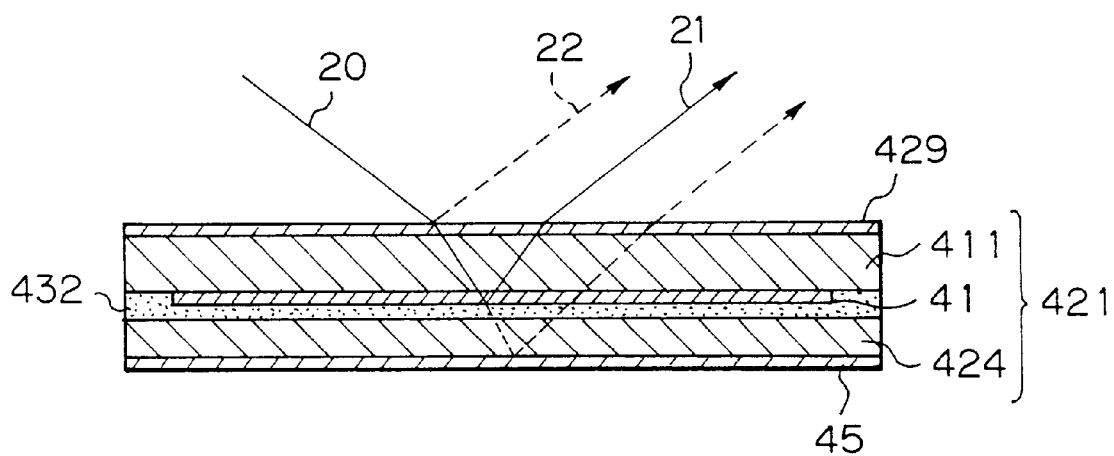
FIGS. 29 and 30 are sectional views showing other embodiments of a holography device in the third aspect of the present invention.
Figure 30:
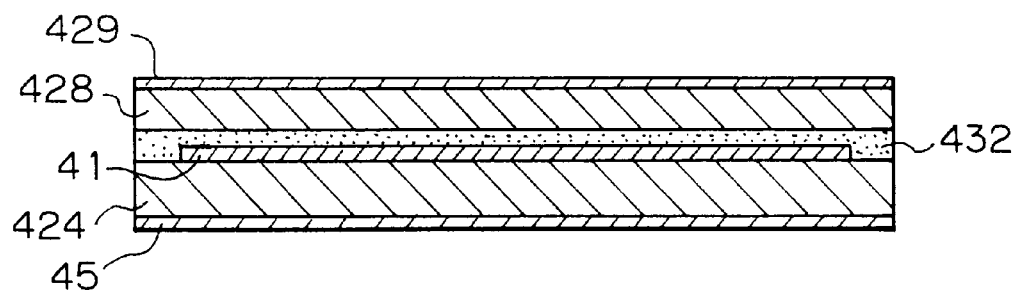

Examples 11 and 12, the third aspect of the present invention, can be applied to other holography devices such as shown in FIGS. 29 and 30. In FIG. 29, an upper cover plate is eliminated and an anti-reflecting film 429 is directly coated onto the surface of the glass substrate 411 of the photosensitive plate 421. In FIG. 30, the glass substrate 411 is eliminated and the photosensitive element 41 is provided on the bottom surface of an upper cover plate 428. The other features are the same as in Examples 11 and 12. These examples allow the thickness of the device to be thinner.

We claim:

1. A holography device comprising:
    a hologram element in which a hologram image is recorded, said hologram image having a surface with reflective characteristics substantially identical to a mirror having a first shape, at least a portion of said surface being defined by a curved plane; and
    a cover plate disposed on said hologram element, said cover plate having an outer surface which has a shape that is substantially identical to said first shape of said mirror, wherein a light beam incident on said outer surface of said cover plate is reflected by said hologram element and exits said outer surface of said cover plate.

2. A holography device according to claim 1, wherein said mirror is a concave mirror having a degree of curvature such that chromatic aberration appears only at a periphery of said hologram element, said cover plate having a concave outer surface.

3. A holography device according to claim 1, wherein said hologram element has a curvature different from said outer surface of said cover plate.

4. A holography device according to claim 3, wherein said hologram element is disposed between said cover plate and another cover plate, said hologram element and said another cover plate being substantially flat.

5. A holography device comprising:
    a hologram element in which a hologram image is recorded, at least a portion of a surface of said hologram image having reflective characteristics substantially identical to a mirror having a first shape; and
    a cover plate disposed on said hologram element, said cover plate having an outer surface which has a shape that is substantially identical to said first shape of said mirror, wherein a light beam incident on said outer surface of said cover plate is reflected by said hologram element and exits said outer surface of said cover plate, and wherein said mirror is a concave mirror.

6., A holography device according to claim 5, wherein said hologram element has a curvature different from said outer surface of said cover plate.

7. A holography device according to claim 6, wherein said hologram element is disposed between said cover plate and another cover plate, said hologram element and said another cover plate being substantially flat.

8. A holography device for diffracting and reflecting an incident beam to produce a reproduction beam for displaying a visible image, said hologram element including a hologram image recorded therein, said hologram image having a surface with at least a portion thereof defined by a curved plane, said at least a portion of said surface of said hologram image having reflective characteristics substantially identical to a mirror having a first shape, said holography device comprising:

an upper cover plate having a surface on which said incident beam is incident, said hologram element being disposed adjacent said upper cover plate, said surface of said upper cover plate having a shape that is substantially identical to said first shape of said mirror so that reflection characteristics of said surface of said cover plate on which said incident beam is incident are substantially identical to diffraction characteristics of said hologram element.

9. A holography device according to claim 8, wherein said diffraction characteristics of said hologram element correspond to reflection characteristics of a concave mirror having a degree of curvature such that chromatic aberration appears only at a periphery of said hologram element, and said cover plate has a concave outer surface.

10. A holography device according to claim 8, wherein said hologram element has a curvature different from surface of said upper cover plate.

11. A holography device according to claim 10, wherein said hologram element is disposed between said upper cover plate and another cover plate, said hologram element and said another cover plate being substantially flat.

12. A holography device for diffracting and reflecting an incident beam to produce a reproduction beam for displaying a visible image, said holography device comprising:

a hologram element including a hologram image recorded therein, said image having a surface with reflection characteristics substantially identical to a concave mirror, an upper cover plate having a surface on which said incident beam is incident, wherein said hologram element is disposed under said upper cover plate, said surface of the upper cover plate having a concave shape that is substantially identical to a shape of a concave surface of said mirror so that reflective characteristics of said cover plate surface are substantially identical to diffraction characteristics of said hologram element.

13. A holography device according to claim 12, wherein said hologram element has a curvature different from said outer surface of said cover plate.

14. A holography device according to claim 13, wherein said hologram element is disposed between said cover plate and another cover plate, said hologram element and said another cover plate being substantially flat.

15. A holography device comprising:

a hologram element having a hologram image recorded therein, said hologram image having reflective characteristics substantially identical to a mirror having a curvature; and a cover plate disposed in covering relation over said hologram element and having an outer surface with a curvature substantially identical to the curvature of the mirror such that a light beam incident on said outer surface of said cover plate is reflected by said hologram image through said outer surface of said cover plate.

16. A holography device according to claim 15, wherein said hologram element is disposed between said cover plate and another cover plate, said hologram element being substantially flat.

* * * * *